(12) United States Patent
Gupta et al.

(10) Patent No.: US 9,495,537 B2
(45) Date of Patent: *Nov. 15, 2016

(54) ADAPTIVE OBSERVATION OF BEHAVIORAL FEATURES ON A MOBILE DEVICE

(71) Applicant: QUALCOMM Incorporated, San Diego, CA (US)

(72) Inventors: Rajarshi Gupta, Sunnyvale, CA (US); Vinay Sridhara, Santa Clara, CA (US); Anil Gathala, Santa Clara, CA (US); Xuetao Wei, Riverside, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/923,547

(22) Filed: Jun. 21, 2013

(65) Prior Publication Data

US 2014/0053260 A1 Feb. 20, 2014

Related U.S. Application Data

(60) Provisional application No. 61/683,274, filed on Aug. 15, 2012, provisional application No. 61/756,963, filed on Jan. 25, 2013.

(51) Int. Cl.

| G06F 21/00 | (2013.01) |
|---|---|
| G06F 21/50 | (2013.01) |
| G06F 21/31 | (2013.01) |
| G06F 21/55 | (2013.01) |

(52) U.S. Cl.
CPC ............ G06F 21/50 (2013.01); G06F 21/316 (2013.01); G06F 21/552 (2013.01)

(58) Field of Classification Search
None
See application file for complete search history.

(56) References Cited

U.S. PATENT DOCUMENTS

| 5,870,735 A | 2/1999 | Agrawal et al. |
|---|---|---|
| 6,532,541 B1 | 3/2003 | Chang et al. |
| 6,643,802 B1 | 11/2003 | Frost et al. |

(Continued)

FOREIGN PATENT DOCUMENTS

| CN | 102202102 A | 9/2011 |
|---|---|---|
| CN | 102591696 A | 7/2012 |

(Continued)

OTHER PUBLICATIONS

Abu-Nimeh S., "Phishing detection using distributed Bayesian additive regression trees", Dec. 13, 2008, Southern Methodist University, 28 pages, XP055107295, ISBN: 9780549908630 chapters 2, 4, 6 and 8.

(Continued)

Primary Examiner — Ghazal Shehni
(74) Attorney, Agent, or Firm — The Marbury Law Group, PLLC

(57) ABSTRACT

Methods, devices and systems for detecting suspicious or performance-degrading mobile device behaviors intelligently, dynamically, and/or adaptively determine computing device behaviors that are to be observed, the number of behaviors that are to be observed, and the level of detail or granularity at which the mobile device behaviors are to be observed. The various aspects efficiently identify suspicious or performance-degrading mobile device behaviors without requiring an excessive amount of processing, memory, or energy resources.

96 Claims, 20 Drawing Sheets

(56) References Cited

U.S. PATENT DOCUMENTS

| | | | |
|---|---|---|---|
| 7,051,327 B1 | 5/2006 | Milius et al. |
| 7,401,359 B2 | 7/2008 | Gartside et al. |
| 7,559,053 B2 | 7/2009 | Krassovsky et al. |
| 7,561,877 B2 | 7/2009 | Cassett et al. |
| 7,571,478 B2 | 8/2009 | Munson et al. |
| 7,600,014 B2 | 10/2009 | Russell et al. |
| 7,650,317 B2 | 1/2010 | Basu et al. |
| 7,676,573 B2 | 3/2010 | Herzog et al. |
| 7,694,150 B1 | 4/2010 | Kirby |
| 7,757,292 B1 | 7/2010 | Renert et al. |
| 7,774,599 B2 | 8/2010 | Guo et al. |
| 7,831,237 B2 | 11/2010 | Passarella et al. |
| 7,831,248 B2 | 11/2010 | Lee |
| 7,849,360 B2 | 12/2010 | Largman et al. |
| 7,852,938 B2 | 12/2010 | Shi et al. |
| 7,877,621 B2 | 1/2011 | Jacoby et al. |
| 7,881,291 B2 | 2/2011 | Grah |
| 7,890,443 B2 | 2/2011 | Zhang et al. |
| 7,945,955 B2 | 5/2011 | Katkar |
| 8,045,958 B2 | 10/2011 | Kahandaliyanage |
| 8,087,067 B2 | 12/2011 | Mahaffey et al. |
| 8,095,964 B1 | 1/2012 | Zhong et al. |
| 8,161,548 B1 | 4/2012 | Wan |
| 8,201,244 B2 | 6/2012 | Sun et al. |
| 8,201,249 B2 | 6/2012 | McCallam |
| 8,225,093 B2 | 7/2012 | Fok et al. |
| 8,245,295 B2 | 8/2012 | Park et al. |
| 8,245,315 B2 | 8/2012 | Cassett et al. |
| 8,266,698 B1 | 9/2012 | Seshardi et al. |
| 8,311,956 B2 | 11/2012 | Sen et al. |
| 8,312,545 B2 | 11/2012 | Tuvell et al. |
| 8,321,941 B2 | 11/2012 | Tuvell et al. |
| 8,331,987 B2 | 12/2012 | Rosenblatt |
| 8,332,945 B2 | 12/2012 | Kim et al. |
| 8,347,386 B2 | 1/2013 | Mahaffey et al. |
| 8,397,301 B2 | 3/2013 | Hering et al. |
| 8,443,439 B2 | 5/2013 | Lamastra et al. |
| 8,458,809 B2 | 6/2013 | Adams et al. |
| 8,516,584 B2 | 8/2013 | Moskovitch et al. |
| 8,533,844 B2 | 9/2013 | Mahaffey et al. |
| 8,554,912 B1 | 10/2013 | Reeves et al. |
| 8,694,744 B1 | 4/2014 | Raj et al. |
| 8,701,192 B1 | 4/2014 | Glick et al. |
| 8,762,298 B1 | 6/2014 | Ranjan et al. |
| 8,763,127 B2 | 6/2014 | Yao et al. |
| 8,775,333 B1 | 7/2014 | Zahn |
| 2002/0099756 A1 | 7/2002 | Catthoor et al. |
| 2004/0039924 A1 | 2/2004 | Baldwin et al. |
| 2004/0068721 A1 | 4/2004 | O'Neill et al. |
| 2004/0083366 A1 | 4/2004 | Nachenberg et al. |
| 2004/0221163 A1 | 11/2004 | Jorgensen et al. |
| 2005/0144480 A1 | 6/2005 | Kim et al. |
| 2006/0026464 A1 | 2/2006 | Atkin et al. |
| 2006/0085854 A1 | 4/2006 | Agrawal et al. |
| 2006/0288209 A1 | 12/2006 | Vogler |
| 2007/0006304 A1 | 1/2007 | Kramer et al. |
| 2007/0136455 A1 | 6/2007 | Lee et al. |
| 2007/0174490 A1 | 7/2007 | Choi et al. |
| 2007/0192866 A1 | 8/2007 | Sagoo et al. |
| 2007/0199060 A1* | 8/2007 | Touboul ............ 726/11 |
| 2007/0220327 A1 | 9/2007 | Ruscio et al. |
| 2007/0283170 A1 | 12/2007 | Yami et al. |
| 2007/0287387 A1 | 12/2007 | Keum et al. |
| 2007/0294768 A1 | 12/2007 | Moskovitch et al. |
| 2008/0016339 A1 | 1/2008 | Shukla |
| 2008/0026464 A1 | 1/2008 | Borenstein et al. |
| 2008/0046755 A1 | 2/2008 | Hayes |
| 2008/0047009 A1 | 2/2008 | Overcash et al. |
| 2008/0086773 A1 | 4/2008 | Tuvell et al. |
| 2008/0109495 A1 | 5/2008 | Herberger et al. |
| 2008/0140821 A1 | 6/2008 | Tada |
| 2008/0162686 A1 | 7/2008 | Kalaboukis et al. |
| 2008/0163382 A1 | 7/2008 | Blue et al. |
| 2008/0172746 A1 | 7/2008 | Lotter et al. |
| 2008/0228429 A1 | 9/2008 | Huang et al. |
| 2009/0019546 A1 | 1/2009 | Park et al. |
| 2009/0019551 A1 | 1/2009 | Haga et al. |
| 2009/0192955 A1 | 7/2009 | Tang et al. |
| 2009/0199296 A1 | 8/2009 | Xie et al. |
| 2009/0217078 A1 | 8/2009 | Cassett et al. |
| 2009/0239531 A1 | 9/2009 | Andreasen et al. |
| 2009/0287618 A1 | 11/2009 | Weinberger et al. |
| 2009/0288080 A1 | 11/2009 | Partridge |
| 2009/0288164 A1 | 11/2009 | Adelstein et al. |
| 2009/0300765 A1 | 12/2009 | Moskovitch et al. |
| 2009/0327168 A1 | 12/2009 | Weinberger et al. |
| 2010/0011029 A1 | 1/2010 | Niemela |
| 2010/0036786 A1 | 2/2010 | Pujara |
| 2010/0082513 A1 | 4/2010 | Liu |
| 2010/0105404 A1 | 4/2010 | Palanki et al. |
| 2010/0107257 A1 | 4/2010 | Ollmann |
| 2010/0128125 A1 | 5/2010 | Warzelhan |
| 2010/0153371 A1 | 6/2010 | Singh |
| 2010/0154032 A1 | 6/2010 | Ollmann |
| 2010/0175135 A1 | 7/2010 | Kandek et al. |
| 2010/0192201 A1 | 7/2010 | Shimoni et al. |
| 2010/0241974 A1 | 9/2010 | Rubin et al. |
| 2010/0251340 A1 | 9/2010 | Martin et al. |
| 2010/0262693 A1 | 10/2010 | Stokes et al. |
| 2010/0296496 A1 | 11/2010 | Sinha et al. |
| 2010/0299292 A1 | 11/2010 | Collazo |
| 2010/0313269 A1 | 12/2010 | Ye |
| 2011/0004935 A1 | 1/2011 | Moffie et al. |
| 2011/0013528 A1 | 1/2011 | Chen |
| 2011/0023118 A1 | 1/2011 | Wright |
| 2011/0060948 A1 | 3/2011 | Beebe |
| 2011/0105096 A1 | 5/2011 | Dods et al. |
| 2011/0145920 A1 | 6/2011 | Mahaffey et al. |
| 2011/0161452 A1 | 6/2011 | Poornachandran et al. |
| 2011/0219449 A1 | 9/2011 | St. Neitzel et al. |
| 2011/0264764 A1 | 10/2011 | Kewalramani et al. |
| 2011/0286437 A1 | 11/2011 | Austin et al. |
| 2011/0302654 A1 | 12/2011 | Miettinen |
| 2011/0302656 A1 | 12/2011 | El-Moussa |
| 2011/0307233 A1 | 12/2011 | Tseng et al. |
| 2012/0016633 A1 | 1/2012 | Wittenstein et al. |
| 2012/0051228 A1 | 3/2012 | Shuman et al. |
| 2012/0060219 A1 | 3/2012 | Larsson et al. |
| 2012/0096539 A1 | 4/2012 | Hu et al. |
| 2012/0110174 A1 | 5/2012 | Wootton et al. |
| 2012/0131674 A1 | 5/2012 | Wittenschlaeger |
| 2012/0151062 A1 | 6/2012 | Gusev et al. |
| 2012/0159633 A1 | 6/2012 | Grachev et al. |
| 2012/0167162 A1 | 6/2012 | Raleigh et al. |
| 2012/0167217 A1 | 6/2012 | McReynolds |
| 2012/0167218 A1 | 6/2012 | Poornachandran et al. |
| 2012/0180126 A1 | 7/2012 | Liu et al. |
| 2012/0207046 A1 | 8/2012 | Di Pietro et al. |
| 2012/0210423 A1 | 8/2012 | Friedrichs et al. |
| 2012/0227105 A1 | 9/2012 | Friedrichs et al. |
| 2012/0233694 A1* | 9/2012 | Baliga ............ G06F 21/568 726/23 |
| 2012/0245481 A1 | 9/2012 | Blanco et al. |
| 2012/0254333 A1 | 10/2012 | Chandramouli et al. |
| 2012/0270611 A1 | 10/2012 | Choi et al. |
| 2012/0311366 A1 | 12/2012 | Alsina et al. |
| 2012/0311708 A1 | 12/2012 | Agarwal et al. |
| 2012/0317306 A1 | 12/2012 | Radinsky et al. |
| 2012/0321175 A1 | 12/2012 | Hedau et al. |
| 2012/0323853 A1 | 12/2012 | Fries et al. |
| 2013/0014262 A1 | 1/2013 | Lee et al. |
| 2013/0031600 A1 | 1/2013 | Luna et al. |
| 2013/0066815 A1 | 3/2013 | Oka et al. |
| 2013/0073983 A1 | 3/2013 | Rasmussen et al. |
| 2013/0097706 A1 | 4/2013 | Titonis et al. |
| 2013/0151848 A1 | 6/2013 | Baumann et al. |
| 2013/0167231 A1 | 6/2013 | Raman et al. |
| 2013/0179991 A1 | 7/2013 | White et al. |
| 2013/0203440 A1 | 8/2013 | Bilange et al. |
| 2013/0204812 A1 | 8/2013 | Sterzing et al. |
| 2013/0247187 A1 | 9/2013 | Hsiao et al. |
| 2013/0267201 A1 | 10/2013 | Gupta et al. |
| 2013/0303154 A1 | 11/2013 | Gupta et al. |
| 2013/0303159 A1 | 11/2013 | Gathala et al. |

(56) References Cited

U.S. PATENT DOCUMENTS

| | | |
|---|---|---|
| 2013/0304676 A1 | 11/2013 | Gupta et al. |
| 2013/0304677 A1 | 11/2013 | Gupta et al. |
| 2013/0304869 A1 | 11/2013 | Gupta et al. |
| 2013/0305101 A1 | 11/2013 | Gupta et al. |
| 2013/0305358 A1 | 11/2013 | Gathala et al. |
| 2013/0305359 A1 | 11/2013 | Gathala et al. |
| 2014/0007183 A1 | 1/2014 | Qureshi et al. |
| 2014/0032358 A1 | 1/2014 | Perkowitz et al. |
| 2014/0051432 A1 | 2/2014 | Gupta et al. |
| 2014/0053261 A1 | 2/2014 | Gupta et al. |
| 2014/0096246 A1 | 4/2014 | Morrissey et al. |
| 2014/0150100 A1 | 5/2014 | Gupta et al. |
| 2014/0187177 A1 | 7/2014 | Sridhara et al. |
| 2014/0188781 A1 | 7/2014 | Fawaz |
| 2014/0205099 A1 | 7/2014 | Christodorescu et al. |
| 2014/0237595 A1 | 8/2014 | Sridhara et al. |
| 2014/0245306 A1 | 8/2014 | Gathala |
| 2014/0279745 A1 | 9/2014 | Esponda et al. |
| 2014/0317734 A1 | 10/2014 | Valencia et al. |
| 2014/0337862 A1 | 11/2014 | Valencia et al. |
| 2015/0148109 A1 | 5/2015 | Gupta et al. |
| 2015/0356462 A1 | 12/2015 | Fawaz et al. |
| 2016/0088009 A1 | 3/2016 | Gupta et al. |

FOREIGN PATENT DOCUMENTS

| | | |
|---|---|---|
| EP | 1182552 A2 | 2/2002 |
| EP | 1983686 A1 | 10/2008 |
| EP | 2182458 A1 | 5/2010 |
| EP | 2326057 A1 | 5/2011 |
| EP | 2406717 A1 | 1/2012 |
| EP | 2680182 A1 | 1/2014 |
| KR | 20060033067 A | 4/2006 |
| TW | 200937198 A | 9/2009 |
| TW | 201129817 A | 9/2011 |
| TW | 201239618 A | 10/2012 |
| WO | 06012375 | 2/2006 |
| WO | 2010048502 | 4/2010 |
| WO | 2010126416 A1 | 11/2010 |
| WO | 2011147580 A1 | 12/2011 |
| WO | 2013016692 A2 | 1/2013 |
| WO | 2013080096 A1 | 6/2013 |
| WO | 2013172865 A1 | 11/2013 |
| WO | 2013173003 A2 | 11/2013 |
| WO | 2013173044 A2 | 11/2013 |

OTHER PUBLICATIONS

Chekina L., et al., "Detection of deviations in mobile applications network behavior", arXiv:1208.0564v2, Aug. 5, 2012, 5 pages, XP055107301, Retrieved from the Internet: URL: http://arxiv.org/abs/1208.0564v2 [retrieved on Nov. 1, 2013] the whole document.
Folino G., et al., "An ensemble-based evolutionary framework for coping with distributed intrusion detection", Genetic Programming and Evolvable Machines, vol. 11, No. 2, Feb. 7, 2010, pp. 131-146, XP019789345, DOI: 10.1007/S10710-010-9101-6 the whole document.
Gao J., et al., "Adaptive distributed intrusion detection using parametric model", Proceedings of the 2009 IEEE/WIC/ACM International Joint Conferences on Web Intelligence and Intelligent Agent Technologies (WI-IAT'09), vol. 1, Sep. 15, 2009, pp. 675-678, XP055107983, DOI: 10.1109/WI-IAT.2009.113 the whole document.
Jean E., et al., "Boosting-based distributed and adaptive security-monitoring through agent collaboration", Proceedings of the 2007 IEEE/WIC/ACM International Conferences on Web Intelligence and Intelligent Agent Technology Workshops (WI-IATW'07), Nov. 5, 2007, pp. 516-520, XP031200055, DOI: 10.1109/WI-IATW. 2007.52 the whole document.
Kachirski O., et al., "Effective Intrusion Detection Using Windows Sensors in Wireless Ad Hoc Networks", IEEE Proceedings of the 36th Hawaii International Conference on System Sciences, 2002, 8 Pages.
Kirda E., et al., "Behavior-Based Spyware Detection", 15th USENIX Security Symposium, 2002, pp. 273-288.
Miluzzo E., et al., "Vision: mClouds—computing on clouds of mobile devices", Proceedings of the 3rd ACM Workshop on Mobile Cloud Computing and Services (MCS'12), Jun. 25, 2012, pp. 9-14, XP055107956, DOI: 10.1145/2307849.2307854 the whole document.
Partial International Search Report—PCT/US2014/012990—ISA/EPO—Jul. 8, 2014.
Schmidt A.D., et al., "Static analysis of executables for collaborative malware detection on android", Proceedings of the 2009 IEEE International Conference on Communications (ICC'09), Jun. 14, 2009, 3 Pages, XP031506460, DOI: 10.1109/ICC.2009.5199486 the whole document.
Shamili A.S., et al., "Malware detection on mobile devices using distributed machine learning", Proceedings of the 20th International Conference on Pattern Recognition (ICPR'10), Aug. 23, 2010, pp. 4348-4351, XP031772702, DOI: 10.1109/ICPR.2010.1057 the whole document.
Tabish S.M., "Malware detection using statistical analysis of byte-level file content", Proceedings of the ACM SIGKDD Workshop on Cybersecurity and Intelligence Informatics (CSI-KDD'09), Jun. 28, 2009, pp. 23-31, XP055107225, DOI: 10.1145/1599272.1599278 the whole document.
De Stefano C., et al., "Pruning GP-Based Classifier Ensembles by Bayesian Networks," Lecture Notes in Computer Science, Sep. 1, 2012, pp. 236-245, XP047016355, DOI: 10.1007/978-3-642-32937-1_24, Sections 1 and 2.
International Search Report and Written Opinion—PCT/US2013/078350—ISA/EPO—Oct. 29, 2014.
Saller K., et al., "Reducing Feature Models to Improve Runtime Adaptivity on Resource Limited Devices," Proceedings of the 16th International Software Product Line Conference (SPLC), Sep. 2, 2012, vol. 11, pp. 135-142, XP058009814, DOI: 10.1145/2364412. 2364435, Section 5.
Caruana, et al., "An Empirical Comparison of Supervised Learning Algorithms", ICML, 2006, 8 pgs.
Caruana, et al., "An Empirical Evaluation of Supervised Learning in High Dimensions", ICML, 2008, 8 pgs.
Qin F., "System Support for Improving Software Dependability During Production Runs," Urbana, Illinois, 1998, pp. 1-116.
Shabtai A., et al., "Dectecting unknown malicious code by applying classification techniques on OpCode patterns," Security Informatics a Springer Open Journal, 2012, vol. 1 (1), pp. 1-22.
Wang Y-M., et al., "STRIDER: A Black-Box, State-based Approach to Change and Configuration Management and Support," 2003 LISA XVII—Oct. 26-31, 2003—San Diego, CA, pp. 165-178.
International Search Report and Written Opinion—PCT/US2014/012990—ISA/EPO—Aug. 26, 2014.
Hu W., et al., "AdaBoost-Based Algorithm for Network Intrusion Detection," IEEE Transactions on Systems, Man, and Cybernetics, Part B: Cybernetics, Apr. 2008, vol. 38 (2), pp. 577-583.
Lu Y. B., et al., "Using Multi-Feature and Classifier Ensembles to Improve Malware Detection", Journal of Chung Cheng Institute of Technology, vol. 39, No. 2, Nov. 2010, pp. 57-72, XP55086345, ISSN: 0255-6030.
Natesan P. et al., "Design of Two Stage Filter Using Enhanced Adaboost for Improving Attack Detection Rates in Network Intrusion Detection", International Journal of Computer Science and Information Technology & Security, vol. 2, No. 2, Apr. 2012, pp. 349-358, XP55086347, ISSN: 2249-955.
Shabta A., "Malware Detection on Mobile Devices", Proceedings of the 11th International Conference on Mobile Data Management, (MDM'2010), May 23, 2010, pp. 289-290, XP031692994, DOI: 10.1109/MDM.2010.28.
Sheen S., et al., "Network Intrusion Detection using Feature Selection and Decision tree classifier," TENCON—IEEE Region 10 Conference, 2008, pp. 1-4.
Shabtai A., et al., "A Andromalya: a behavioral malware detection framework for android devices", Journal of Intelligent Information Systems, Kluwer Academic Publishers, BO, vol. 38, No. 1, Jan. 6, 2011, pp. 161-190, XP019998836, ISSN: 1573-7675, DOI: 10.1007/S10844-010-0148-X paragraph [5.3.1]-paragraph [5.3.4].

(56) References Cited

OTHER PUBLICATIONS

Kolter J.Z., et al., "Learning to Detect Malicious Executables in the Wild", ACM Knowl. Discovery and Data Mining (KDD), 2004, pp. 470-478.
Gavin McWilliams: "Malware detection methods for fixed and mobile networks", Centre For Secure Information Technologies—Queen's University Belfast, Jan. 23, 2013, pp. 1-21, XP017577639, [retrieved on Jan. 23, 2013] the whole document.
Jarle Kittilsen: "Detecting malicious PDF documents", Dec. 1, 2011, pp. 1-112, XP055947997, Gjovik, Norway Retrieved from the Internet: URL:http:f/brage.bibsys.no/hig/retrieve/21 28/JarleKittilsen.pdf [retrieved on Dec. 14, 2012] the whole document.
Yerima.S.Y. et al., "A New Android Malware Detection Approach Using Bayesian Classification", 2014 IEEE 28th International Conference on advanced Information Networking and Applications, IEEE, Mar. 25, 2013, pp. 121-128, XP032678454, ISSN: 1550-445X, DOI: 10.1109/AINA.2013.88 ISBN: 978-1-4673-5550-6 [retrieved on Jun. 13, 2013] the whole document.
Burguera I., et al., "Crowdroid", Security and Privacy in Smartphones and Mobile Devices, ACM, 2 Penn Plaza, Suite 701 New York NY 10121-0701 USA, Oct. 17, 2011, XP058005976, DOI: 10.1145/2046614.2046619 ISBN: 978-1-4503-1000-0, pp. 15-26.
Kaspersky Endpoint Security 8 for Smartphone Program Version 8.0, Updated on Feb. 8, 2012.
Schmidt A.D., et al., "Monitoring Smartphones for Anomaly Detection", Mobile Networks and Applications, vol. 14, No. 1, Feb. 1, 2009, pp. 92-106, XP055115882, ISSN: 1383-469X, DOI:10.1007/s11036-008-0113-x.
Lee., et al., "A Data Mining Framework for Building Intrusion Detection Models", Published in: Proceedings of the 1999 IEEE Symposium on Security and Privacy, 1999. Backspace, Conference Location: Oakland, CA, Date of Conference: 1999, pp. 120-132, Meeting Date: May 9, 1999-May 12, 1999.
Tan, P.N., et al., "Introduction to data mining," Library of Congress, 2006, Chapter 4.
Voulgaris., et al., "Dimensionality Reduction for Feature and Pattern Selection in Classification Problems", Published in:, 2008. ICCGI '08. The Third International Multi-Conference on Computing in the Global Information Technology, Conference Location: Athens Date of Conference: Jul. 27, 2008-Aug. 1, 2008, pp. 160-165.
Taiwan Search Report—TW103102837—Tipo—Mar. 15, 2016.
Faddoul J.B., et al, "Boosting Multi-Task Weak Learners with Applications to Textual and Social Data," Ninth International Conference on Machine Learning and Applications (ICMLA), Dec 2010, pp. 367-372.

\* cited by examiner

ADAPTIVE OBSERVATION OF BEHAVIORAL FEATURES ON A MOBILE DEVICE

RELATED APPLICATIONS

This application claims the benefit of priority to U.S. Provisional Patent Application No. 61/756,963 entitled "Adaptive Observation of Behavioral Features on a Mobile Device" filed Jan. 25, 2013, and U.S. Provisional Application No. 61/683,274, entitled "System, Apparatus and Method for Adaptive Observation of Mobile Device Behavior" filed Aug. 15, 2012, the entire contents of both which are hereby incorporated by reference for all purposes.

BACKGROUND

Cellular and wireless communication technologies have seen explosive growth over the past several years. This growth has been fueled by better communications, hardware, larger networks, and more reliable protocols. Wireless service providers are now able to offer their customers an ever-expanding array of features and services, and provide users with unprecedented levels of access to information, resources, and communications. To keep pace with these service enhancements, mobile electronic devices (e.g., cellular phones, tablets, laptops, etc.) have become more powerful and complex than ever. This complexity has created new opportunities for malicious software, software conflicts, hardware faults, and other similar errors or phenomena that can negatively impact a mobile device's long-term and continued performance and power utilization levels. Therefore, identifying and correcting the conditions and/or mobile device behaviors that may negatively impact the mobile device's long term and continued performance and power utilization levels is beneficial to consumers.

SUMMARY

The various aspects include methods, devices and systems for adaptive observations of behavior features of mobile devices in order to efficiently identify, prevent, and/or correct the conditions and/or mobile device behaviors that often degrade a mobile device's performance and/or power utilization levels over time. An aspect includes a method for observing mobile device behaviors over a period of time to recognize mobile device behaviors inconsistent with normal operation patterns. This aspect method may include dynamically selecting for observation one or more mobile device behaviors from the group mobile device operations, mobile device events, data network activity, system resource usage, mobile device state, inter-process communications, driver statistics, hardware component status, hardware counters, actions or operations of software applications; software downloads, changes to device or component settings, conditions and events at an application level, conditions and events at the radio level, and conditions and events at the sensor level, and adaptively observing the mobile device behaviors to identify a suspicious mobile device behavior from a limited set of observations.

In an aspect method, the mobile device operations may include one or more of library application programming interface (API) calls in an application framework or run-time library, system call APIs, file-system and networking sub-system operations, file system activity, searches for filenames, categories of file accesses, creating files, deleting files, file read/write/seek operations, and changing file permissions.

In an aspect method, the mobile device events may include one or more of device state changes and sensor devices state changes. In an aspect, data network activity may include one or more of types of connections, protocols, port numbers, server/client that the device is connected to, the number of connections, volume or frequency of communications, phone network activity, type and number of calls/messages sent, type and number of calls/messages received, type and number of calls/messages intercepted, call information, text messaging information, media messaging, user account information, transmissions, voicemail, and device identifiers.

In an aspect, the mobile device system resource usage may include one or more of monitoring the number of forks, memory access operations, and the number of files open. In an aspect method, the mobile device state may include one or more of display on/off state, locked/unlocked state, battery charge state, camera state, and microphone state.

In an aspect, the mobile device inter-process communications may include one or more of monitoring intents to crucial services, monitoring the degree of inter-process communications, and monitoring pop-up windows. In an aspect, driver statistics may include statistics from drivers for one or more of cameras, sensors, electronic displays, WiFi communication components, data controllers, memory controllers, system controllers, access ports, peripheral devices, wireless communication components, and external memory chips.

In an aspect, the mobile device hardware component status may include one or more of cameras, sensors, electronic displays, WiFi communication components, data controllers, memory controllers, system controllers, access ports, timers, peripheral devices, wireless communication components, external memory chips, voltage regulators, oscillators, phase-locked loops, peripheral bridges, and other similar components used to support the processors and clients running on the mobile computing device.

In an aspect, the mobile device hardware counters may include one or more of hardware counters that denote the state or status of the mobile computing device and/or mobile device sub-systems, and special-purpose registers of processors/cores that are configured to store a count or state of hardware-related activities or events.

In an aspect, actions or operations of software applications may include monitoring of information used by software applications including one or more of location information, camera information, accelerometer information, browser information, content of browser-based communications, content of voice-based communications, short range radio communications, content of text-based communications, content of recorded audio files, phonebook or contact information, contacts lists, calendar information, location information, recorded audio information, accelerometer information, notifications communicated to and from a software application, user verifications, and a user password.

In an aspect, software downloads may include one or more of software downloads from an application download server, and a first software application requesting the downloading and/or install of a second software application.

In an aspect, changes to device or component settings may include changes to one or more of compass information, mobile device settings, battery life, gyroscope information, pressure sensors, and screen activity.

In an aspect, conditions and events at the application level may include one or more of observing user via facial recognition software, observing social streams, observing notes entered by the user, observing event pertaining to use of an electronic payment service (such as PassBook, Google Wallet, and Paypal), observing events relating to use of virtual private networks, synchronization, voice searches, voice control, language translators, offloading of data for computations, video streaming, camera usage without user activity, and microphone usage without user activity.

In an aspect, conditions and events at the radio level may include determining the presence, existence or amount of any or all of: user interaction with the mobile device before establishing radio communication links or transmitting information, multiple subscriber identity module cards, Internet radio, mobile phone tethering, offloading data for computations, device state communications, the use as a game controller or home controller, vehicle communications, mobile device synchronization, monitoring the use of radios (WiFi, WiMax, Bluetooth, etc.) for positioning, peer-to-peer (p2p) communications, synchronization, vehicle to vehicle communications, and/or machine-to-machine (m2m), and monitoring network traffic usage, statistics, or profiles.

In an aspect, conditions and events at the events at the sensor level may include of one or more of monitoring magnet sensors, detecting near-field communications, collecting information from a credit card scanner, barcode scanner, or mobile tag reader, detecting the presence of USB power charging source, detecting that a keyboard or auxiliary device has been coupled to the mobile device, detecting that the mobile device has been coupled to a computing device (e.g., via USB, etc.), determining if an LED, flash, flashlight, or light source has been modified or disabled (e.g., maliciously disabling an emergency signaling app, etc.), determining if a speaker or microphone has been turned on or powered, detecting a charging or power event, detecting that the mobile device is being used as a game controller, collecting information from medical purpose/healthcare sensors or from scanning the user's body, collecting information from an external sensor plugged into one of a universal serial bus (USB) port and an audio jack, collecting information from a tactile or haptic sensor, and collecting information pertaining to the thermal state of the mobile device.

In an aspect, dynamically selecting for observation one or more mobile device behaviors may include observing mobile device behaviors over the period of time, and identifying a limited set of behaviors associated with inconsistent operations as the mobile device behaviors to be observed.

In an aspect, identifying a limited set of behaviors associated with inconsistent operations as the mobile device behaviors to be observed may include receiving behavior inputs from one or more of a high-level application, a system kernel and a driver API after filtering by an adaptive filter, receiving context information regarding operations of the mobile device, performing spatial correlations of the received behavior inputs and the received context input, and generating a behavior vector.

In an aspect, generating a behavior vector may include generating a vector data structure that succinctly describes the observed mobile device behaviors. In an aspect, generating a behavior vector may include generating a vector that may include information collected from APIs at various levels/modules of the mobile device. In an aspect, generating a behavior vector may include generating a vector that may include information pertaining to one or more of library API calls, system calls, file-system and networking subsystem operations, sensor device state changes, file system activity, network activity, telephone activity, memory access operations, a state of the mobile device, a power on/off state of an electronic display of the mobile device, a locked/unlocked state the mobile device, an amount of battery power remaining, inter-process communications, driver statistics, and hardware counters.

In an aspect, generating a behavior vector may include generating a vector data structure that may include series of numbers, each of which signifies a feature or a behavior of the mobile device. In an aspect, at least one of the series of numbers identifies one or more of whether a camera of the mobile device is in use or not in use, how much network traffic has been generated by the mobile device, and how many internet messages have been sent from the mobile device.

In an aspect, generating a behavior vector may include generating a vector that may include at least one of call information, text messaging information, media messaging information, user account information, location information, camera information, accelerometer information, and browser information. In an aspect, generating a behavior vector may include generating a vector that may include information collected at an application level of the mobile device. In an aspect, generating a behavior vector may include generating a vector that may include information collected at a radio level of the mobile device. In an aspect, generating a behavior vector may include generating a vector that may include information collected at a sensor level of the mobile device.

In an aspect, identifying a limited set of behaviors associated with inconsistent operations as the mobile device behaviors to be observed further may include performing temporal correlations of the received behavior inputs and the received context input, wherein generating a behavior vector may include generating a behavior vector based on a result of the spatial and temporal correlations.

A further aspect includes a mobile computing device having a multi-core processor including two or more processor cores, one or more of which is configured with processor-executable instructions to perform operations of the methods described above. A further aspect includes a mobile device having means for performing the functions and operations of the methods described above. A further aspect includes a non-transitory processor-readable storage medium having stored thereon processor-executable instructions configured to cause a processor to perform operations of the methods described above.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1:
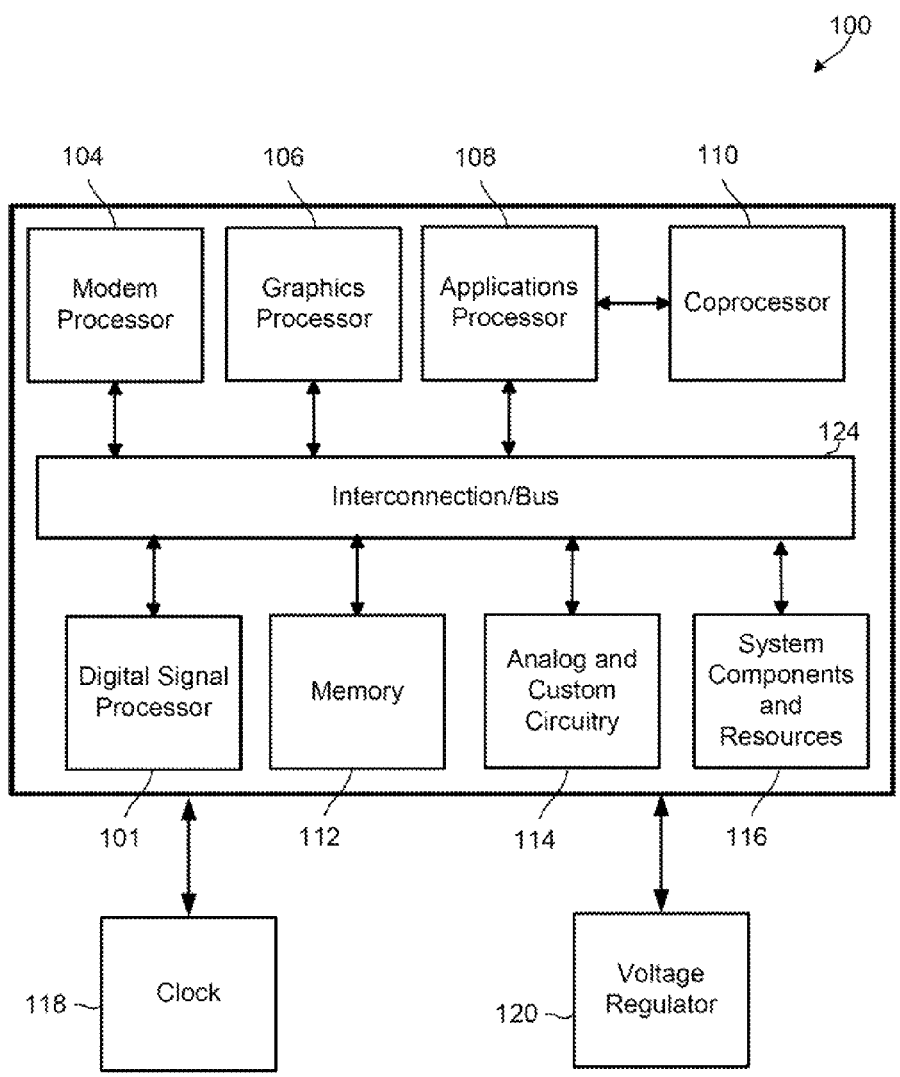
FIG. 1 is an architectural diagram of an example system on chip suitable for implementing the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile computing device" and "mobile device" are used interchangeably herein to refer to any one or all of cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, wireless gaming controllers, and similar personal electronic devices which include a memory, a programmable processor for which performance is important, and operate under battery power such that power conservation methods are of benefit. While the various aspects are particularly useful for mobile computing devices, such as smartphones, which have limited resources and run on battery, the aspects are generally useful in any electronic device that includes a processor and executes application programs.

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used herein to refer to machine language code (such as object code) whose format is understandable by a processor.

The term "performance degradation" is used herein to refer to a wide variety of undesirable mobile device operations and characteristics, such as longer processing times, lower battery life, loss of private data, malicious economic activity (e.g., sending unauthorized premium SMS message), operations relating to commandeering the mobile device or utilizing the phone for spying or botnet activities, etc.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "multicore processor" is used herein to refer to a single integrated circuit (IC) chip or chip package that contains two or more independent processing cores (e.g., CPU cores) configured to read and execute program instructions. An SOC may include multiple multicore processors, and each processor in an SOC may be referred to as a core. The term "multiprocessor" is used herein to refer to a system or device that includes two or more processing units configured to read and execute program instructions.

Generally, the performance and power efficiency of a mobile device degrades over time. Recently, anti-virus companies (e.g., McAfee, Symantec, etc.) have begun marketing mobile anti-virus, firewall, and encryption products that aim to slow this degradation. However, many of these solutions rely on the periodic execution on the mobile device, of a computationally-intensive scanning engine that may consume many of the mobile device's processing and battery resources, slow or render the mobile device useless for extended periods of time, and/or otherwise degrade the user experience. In addition, these solutions are typically limited to detecting known viruses and malware, and do not address the multiple complex factors and/or the interactions that often combine to contribute to a mobile device's degradation over time (e.g., when the performance degradation is not caused by viruses or malware). For these and other reasons, existing anti-virus, firewall, and encryption products do not provide adequate solutions for identifying the numerous factors that may contribute to a mobile device's degradation over time, for preventing mobile device degradation, or for efficiently restoring an aging mobile device to its original condition.

Various other solutions exist for modeling the behavior of processes or application programs executing on a computing device, and such behavior models may be used to differentiate between malicious and benign process/programs on computing devices. However, these existing modeling solutions are not suitable for use on mobile devices because such solutions generally require the execution of computationally-intensive processes that consume a significant amount of processing, memory, and energy resources, all of which may be scarce on mobile devices. In addition, these solutions are generally limited to evaluating the behavior of individual application programs or processes, and do not provide an accurate or complete model of the performance-degrading mobile device behaviors. For these and other reasons, existing modeling solutions are not adequate for identifying the numerous factors that may contribute to a mobile device's degradation over time, for preventing mobile device degradation, or for efficiently restoring an aging mobile device to its original condition.

There are a variety of factors that may contribute to the degradation in performance and power utilization levels of a mobile device over time, including poorly designed software applications, malware, viruses, fragmented memory, background processes, etc. However, due to the complexity of modern mobile devices, it is increasingly difficult for users, operating systems, and/or application programs (e.g., anti-virus software, etc.) to accurately and efficiently identify the sources of such problems and/or to provide adequate remedies to identified problems. As a result, mobile device users currently have few remedies for preventing the degradation in performance and power utilization levels of a mobile device over time, or for restoring an aging mobile device to its original performance and power utilization levels.

The various aspects provide devices, systems, and methods for efficiently identifying, preventing, and/or correcting the conditions and/or mobile device behaviors that often degrade a mobile device's performance and/or power utilization levels over time.

As mentioned above, mobile devices are resource constrained systems that have relatively limited processing, memory, and energy resources. As also mentioned above, modern mobile devices are complex systems, and there are a large number (i.e., thousands) of factors that may contribute to the mobile device's degradation over time. Due to these constraints, it is often not feasible to monitor/observe all the various processes, behaviors, or factors (or combinations thereof) that may degrade performance and/or power utilization levels of the complex yet resource-constrained systems of modern mobile devices.

To overcome the above mentioned limitations of existing solutions, the various aspects intelligently, dynamically, and/or adaptively determine mobile device behaviors that are to be observed, the number of behaviors that are to be observed, and the level of detail (i.e., granularity) at which the mobile device behaviors are to be observed. The various aspects efficiently identify suspicious or performance-degrading mobile device behaviors without consuming an excessive amount of processing, memory, or energy resources. Various aspects may correct suspicious or performance-degrading mobile device behaviors. Various aspects may prevent the identified suspicious or performance-degrading mobile device behaviors from degrading the performance and power utilization levels of a mobile device over time. Various aspects may restore an aging mobile device to its original performance and power utilization levels.

In an aspect, a mobile device processor may be configured to observe any or all of library application programming interface (API) calls, system call APIs, file-system operations, networking sub-system operations, driver API calls for the numerous sensors, state changes, and other similar events/operations at a high level, and perform real-time behavior analysis operations based on these high level observations to identify programs/processes that may contribute to the mobile device's degradation over time (e.g., programs that are actively malicious, poorly written, etc.). The mobile device processor may be configured to intelligently increase the level of detail (i.e., granularity) at which the mobile device behaviors are to be observed until enough information is available to identify and/or correct the cause of a suspicious or performance-degrading mobile device behavior.

In an aspect, the mobile device processor may be configured to dynamically change the set of observed behaviors (e.g., by selecting new behaviors to observe, observing fewer behaviors, etc.) based on the results of the on-line real-time analysis operations and/or the availability of system resources.

In various aspects, the mobile device processor may be configured to dynamically adjust the observation granularity (i.e., the level of detail at which mobile device behaviors are observed) based on the results of the real-time analysis operations and/or based on the availability of system resources. For example, in various aspects, the mobile device processor may be configured to recursively increase the granularity of one or more observations (i.e., make finer or more detailed observations) until a source of a suspicious or performance-degrading mobile device behavior is identified, until a processing threshold is reached, or until the mobile device processor determines that the source of the suspicious or performance-degrading mobile device behavior cannot be identified from further increases in observation granularity.

In an aspect, the mobile device processor may be configured to dynamically adjust the observation granularity based on the availability of system resources. For example, the mobile device processor may be configured to increase the observation granularity in response to determining that mobile device resources are available or underutilized or that the mobile is currently connected to a power supply. As another example, the mobile device processor may be configured to reduce the observation granularity in response to determining that the computing device is under heavy load or low battery.

In an aspect, an observer process, daemon, module, or sub-system (herein collectively referred to as a "module") of the mobile device may instrument or coordinate various application programming interfaces (APIs) at various levels of the mobile device system, and collect behavior information from the instrumented APIs. In an aspect, the mobile device may also include an analyzer module, and the analyzer module may generate one or more classifiers. The observer module may communicate (e.g., via a memory write operation, function call, etc.) the collected behavior information to the classifier module and/or the analyzer module (e.g., via a memory write operation, etc.) of the mobile device, which may analyze and/or classify the collected behavior information, generate behavior vectors, generate spatial and/or temporal correlations based on the behavior vector and information collected from various other mobile device sub-systems, and/or determine whether a particular mobile device behavior, software application, or process is benign, suspicious, or malicious/performance-degrading. In various aspects, the generated behavior vectors and spatial/temporal correlations may be used by various modules (e.g., by an actuation module, etc.) of the mobile device to identify and/or respond to behaviors that are determined to have a high probably of negatively impacting the mobile device's performance or battery consumption levels.

The analyzer module of the mobile device may be configured to perform real-time analysis operations, which may include applying data, algorithms, and/or behavior models to behavior information collected by the observer module to determine whether a mobile device behavior is benign, suspicious, or malicious/performance-degrading. In an aspect, the analyzer module may be configured to determine that a mobile device behavior is suspicious when the classifier does not have sufficient information to classify or conclusively determine that the behavior is either benign or malicious. In an aspect, the analyzer module may be configured to communicate the results of its real-time analysis operations to the observer module when it determines that a device behavior is suspicious. The observer module may adjust the granularity of its observations (i.e., the level of detail at which mobile device behaviors are observed) and/or change the behaviors that are observed based on information received from the analyzer module (e.g., results of the real-time analysis operations), generate or collect new or additional behavior information, and send the new/additional information to the classifier module for further analysis/classification.

Such feedback communications between the observer and analyzer modules (e.g., analyzer module sending the results of its real-time analysis operations to the observer module, and the observer module sending updated behavior information to the analyzer module) may enable a mobile device processor to recursively increase the granularity of the observations (i.e., make finer or more detailed observations) or change the features/behaviors that are observed until a source of a suspicious or performance-degrading mobile device behavior is identified, until a processing or battery consumption threshold is reached, or until the mobile device processor determines that the source of the suspicious or performance-degrading mobile device behavior cannot be identified from further increases in observation granularity. Such feedback communications also enable the mobile device processor to adjust or modify the data/behavior models locally in the mobile device without consuming an excessive amount of the mobile device's processing, memory, or energy resources.

In various aspects, the observer module and/or analyzer module may generate behavior vectors that include a concise definition of the observed behaviors. That is, a behavior vector may succinctly describe observed behavior of the mobile device, software application, or process in a value or vector data-structure (e.g., in the form of a string of numbers, etc.). A behavior vector may also function as an identifier that enables the mobile device system to quickly recognize, identify, and/or analyze mobile device behaviors. In an aspect, the observer module and/or analyzer module may generate a behavior vector that includes series of numbers, each of which signifies a feature or a behavior of the mobile device. For example, numbers included in the behavior vector may signify whether a camera of the mobile device is in use (e.g., as zero or one), how much network traffic has been transmitted from or generated by the mobile device (e.g., 20 KB/sec, etc.), how many internet messages have been communicated (e.g., number of SMS messages, etc.), etc.

The various aspects may be implemented in a number of different mobile devices, including single processor and multiprocessor systems, and a system-on-chip (SOC). FIG. 1 is an architectural diagram illustrating an example system-on-chip (SOC) 100 architecture that may be used in computing devices implementing the various aspects. The SOC 100 may include a number of heterogeneous processors, such as a digital signal processor (DSP) 101, a modem processor 104, a graphics processor 106, and an application processor 108. The SOC 100 may also include one or more coprocessors 110 (e.g., vector co-processor) connected to one or more of the heterogeneous processors 102, 104, 106, 108. Each processor 102, 104, 106, 108, 110 may include one or more cores, and each processor/core may perform operations independent of the other processors/cores. For example, the SOC 100 may include a processor that executes a first type of operating system (e.g., FreeBSD, LINUX, OS X, etc.) and a processor that executes a second type of operating system (e.g., Microsoft Windows 8).

The SOC 100 may also include analog circuitry and custom circuitry 114 for managing sensor data, analog-to-digital conversions, wireless data transmissions, and for performing other specialized operations, such as processing encoded audio signals for games and movies. The SOC 100 may further include system components and resources 116, such as voltage regulators, oscillators, phase-locked loops, peripheral bridges, data controllers, memory controllers, system controllers, access ports, timers, and other similar components used to support the processors and clients running on a computing device.

The system components 116 and custom circuitry 114 may include circuitry to interface with peripheral devices, such as cameras, electronic displays, wireless communication devices, external memory chips, etc. The processors 102, 104, 106, 108 may be interconnected to one or more memory elements 112, system components, and resources 116 and custom circuitry 114 via an interconnection/bus module 124, which may include an array of reconfigurable logic gates and/or implement a bus architecture (e.g., CoreConnect, AMBA, etc.). Communications may be provided by advanced interconnects, such as high performance networks-on chip (NoCs).

The SOC 100 may further include an input/output module (not illustrated) for communicating with resources external to the SOC, such as a clock 118 and a voltage regulator 120. Resources external to the SOC (e.g., clock 118, voltage regulator 120) may be shared by two or more of the internal SOC processors/cores (e.g., DSP 102, modem processor 104, graphics processor 106, applications processor 108, etc.).

The SOC 100 may also include hardware and/or software components suitable for collecting sensor data from sensors, including speakers, user interface elements (e.g., input buttons, touch screen display, etc.), microphone arrays, sensors for monitoring physical conditions (e.g., location, direction, motion, orientation, vibration, pressure, etc.), cameras, compasses, GPS receivers, communications circuitry (e.g., Bluetooth®, WLAN, WiFi, etc.), and other well known components (e.g., accelerometer, etc.) of modern electronic devices.

In addition to the SOC 100 discussed above, the various aspects may be implemented in a wide variety of computing systems, which may include a single processor, multiple processors, multicore processors, or any combination thereof.

Figure 2:
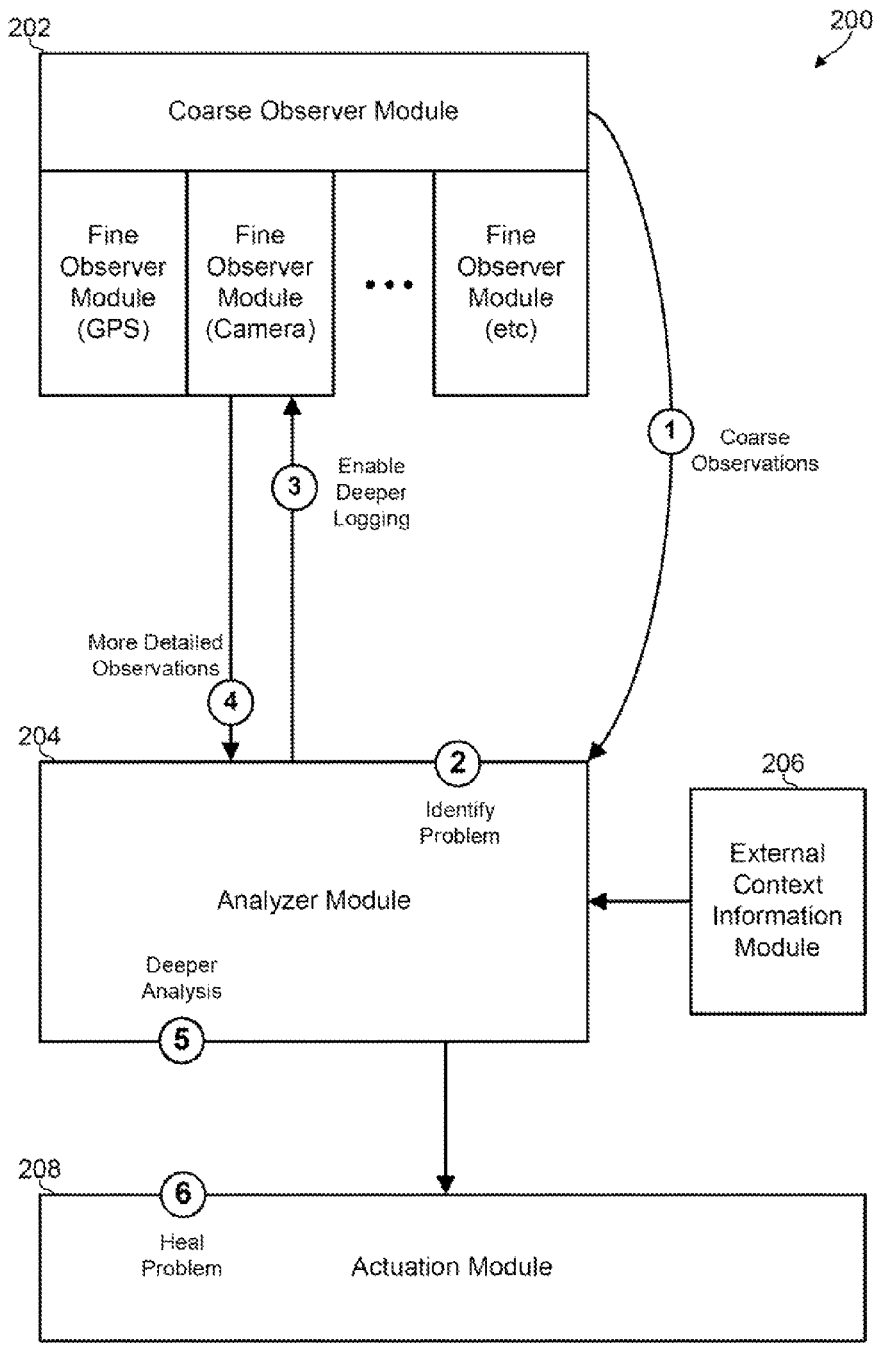
FIG. 2 is a block diagram illustrating example logical components and information flows in a computing system configured to perform dynamic and adaptive observations in accordance with the various aspects.

FIG. 2 illustrates example logical components and information flows in a computing system 200 configured to perform dynamic and adaptive observations in accordance with the various aspects. In the example illustrated in FIG. 2, the computing system 200 includes a coarse observer module 202, an analyzer module 204, an external context information module 206, and an actuation module 208.

Each of the modules 202-208 may be implemented in software, hardware, or any combination thereof. In various aspects, the modules 202-208 may be implemented within parts of the operating system (e.g., within the kernel, in the kernel space, in the user space, etc.), within separate programs or applications, in specialized hardware buffers or processors, or any combination thereof. In an aspect, one or more of the modules 202-208 may be implemented as software instructions executing on one or more processors of the mobile device 102.

The behavior observer module 202 may be configured to instrument or coordinate APIs at various levels/modules of the mobile device, and monitor/observe mobile device operations and events (e.g., system events, state changes, etc.) at the various levels/modules via the instrumented APIs, collect information pertaining to the observed operations/events, intelligently filter the collected information, generate one or more observations based on the filtered information, store the generated observations in a memory (e.g., in a log file, cache memory, etc.) and/or send (e.g., via memory writes, function calls, etc.) the generated observations to the behavior analyzer module 204.

The behavior observer module 202 may monitor/observe mobile device operations and events by collecting information pertaining to library application programming interface (API) calls in an application framework or run-time libraries, system call APIs, file-system and networking subsystem operations, device (including sensor devices) state changes, and other similar events. The behavior observer module 202 may also monitor file system activity, which may include searching for filenames, categories of file accesses (personal info or normal data files), creating or deleting files (e.g., type exe, zip, etc.), file read/write/seek operations, changing file permissions, etc.

The behavior observer module 202 may also monitor/observe data network activity, which may include types of connections, protocols, port numbers, server/client that the device is connected to, the number of connections, volume or frequency of communications, etc. The behavior observer module 202 may monitor phone network activity, which may include monitoring the type and number of calls or messages (e.g., SMS, etc.) sent out, received, or intercepted (e.g., the number of premium calls placed).

The behavior observer module 202 may also monitor/observe the system resource usage, which may include monitoring the number of forks, memory access operations, number of files open, etc. The behavior observer module 202 may monitor the state of the mobile device, which may include monitoring various factors, such as whether the display is on or off, whether the device is locked or unlocked, the amount of battery remaining, the state of the camera, etc. The behavior observer module 202 may also monitor inter-process communications (IPC) by, for example, monitoring intents to crucial services (browser, contracts provider, etc.), the degree of inter-process communications, pop-up windows, etc.

The behavior observer module 202 may also monitor/observe driver statistics and/or the status of one or more hardware components, which may include cameras, sensors, electronic displays, WiFi communication components, data controllers, memory controllers, system controllers, access ports, timers, peripheral devices, wireless communication components, external memory chips, voltage regulators, oscillators, phase-locked loops, peripheral bridges, and other similar components used to support the processors and clients running on the mobile computing device.

The behavior observer module 202 may also monitor/observe one or more hardware counters that denote the state or status of the mobile computing device and/or mobile device sub-systems. A hardware counter may include a special-purpose register of the processors/cores that is configured to store a count or state of hardware-related activities or events occurring in the mobile computing device.

The behavior observer module 202 may also monitor/observe actions or operations of software applications, software downloads from an application download server (e.g., Apple® App Store server), mobile device information used by software applications, call information, text messaging information (e.g., SendSMS, BlockSMS, ReadSMS, etc.), media messaging information (e.g., ReceiveMMS), user account information, location information, camera information, accelerometer information, browser information, content of browser-based communications, content of voice-based communications, short range radio communications (e.g., Bluetooth, WiFi, etc.), content of text-based communications, content of recorded audio files, phonebook or contact information, contacts lists, etc.

The behavior observer module 202 may monitor/observe transmissions or communications of the mobile device, including communications that include voicemail (VoiceMailComm), device identifiers (DeviceIDComm), user account information (UserAccountComm), calendar information (CalendarComm), location information (LocationComm), recorded audio information (RecordAudioComm), accelerometer information (AccelerometerComm), etc.

The behavior observer module 202 may monitor/observe usage of and updates/changes to compass information, mobile device settings, battery life, gyroscope information, pressure sensors, magnet sensors, screen activity, etc. The behavior observer module 202 may monitor/observe notifications communicated to and from a software application (AppNotifications), application updates, etc. The behavior observer module 202 may monitor/observe conditions or events pertaining to a first software application requesting the downloading and/or install of a second software application. The behavior observer module 202 may monitor/observe conditions or events pertaining to user verification, such as the entry of a password, etc.

The mobile device processor may be configured to observe conditions or events at multiple levels of the mobile device, including the application level, radio level, and sensor level. Application level observations may include observing the user via facial recognition software, observing social streams, observing notes entered by the user, observing events pertaining to use of an electronic payment service, such as PassBook/Google Wallet/Paypal, etc. Application level observations may also include observing events relating to the use of virtual private networks (VPNs) and events pertaining to synchronization, voice searches, voice control (e.g., lock/unlock a phone by saying one word), language translators, the offloading of data for computations, video streaming, camera usage without user activity, microphone usage without user activity, etc.

Radio level observations may include determining the presence, existence or amount of any or more of: user interaction with the mobile device before establishing radio communication links or transmitting information, dual or multiple subscriber identity modules (SIM) or SIM cards, Internet radio, mobile phone tethering, offloading data for computations, device state communications, the use as a game controller or home controller, vehicle communications, mobile device synchronization, etc. Radio level observations may also include monitoring the use of radios (WiFi, WiMax, Bluetooth, etc.) for positioning, peer-to-peer (p2p) communications, synchronization, vehicle to vehicle communications, and/or machine-to-machine (m2m). Radio level observations may further include monitoring network traffic usage, statistics, or profiles.

Sensor level observations may include monitoring a magnet sensor or other sensor to determine the usage and/or external environment of the mobile device. For example, the mobile device processor may be configured to determine whether the phone is in a holster (e.g., via a magnet sensor configured to sense a magnet within the holster) or in the user's pocket (e.g., via the amount of light detected by a camera or light sensor). Detecting that the mobile device is in a holster may be relevant to recognizing suspicious behaviors, for example, because activities and functions related to active usage by a user (e.g., taking photographs or videos, sending messages, conducting a voice call, recording sounds, etc.) occurring while the mobile device is holstered could be signs of nefarious processes executing on the device (e.g., to track or spy on the user). Other examples of sensor level observations related to usage or external environments include, detecting near-field communications (NFC), collecting information from a credit card scanner, barcode scanner, or mobile tag reader, detecting the presence of a USB power charging source, detecting that a keyboard or auxiliary device has been coupled to the mobile device, detecting that the mobile device has been coupled to a computing device (e.g., via USB, etc.), determining whether a light emitting diode (LED), flash, flashlight, or light source has been modified or disabled (e.g., maliciously disabling an emergency signaling app, etc.), detecting that a speaker or microphone has been turned on or powered, detecting a charging or power event, detecting that the mobile device is being used as a game controller, etc. Sensor level observations may also include collecting information from medical or healthcare sensors or from scanning the user's body, collecting information from an external sensor plugged into the USB/audio jack, collecting information from a tactile or haptic sensor (e.g., via a vibrator interface, etc.), collecting information pertaining to the thermal state of the mobile device, etc.

To reduce the number of factors monitored to a manageable level, in an aspect, the behavior observer module 202 may perform coarse observations by monitoring/observing an initial set of behaviors or factors that are a small subset of all factors that could contribute to the mobile device's degradation. In an aspect, the behavior observer module 202 may receive the initial set of behaviors and/or factors from a network server 116 and/or a component in a cloud service provider network 118. In an aspect, the initial set of behaviors/factors may be specified in data/behavior models received from the network server 116 or cloud service provider network 118.

The analyzer module 204 may include intelligence for utilizing the limited set of information (i.e., coarse observations) to identify behaviors, processes, or programs that are contributing to (or are likely to contribute to) the device's degradation over time, or which may otherwise cause problems on the device. For example, the analyzer module 204 may be configured to analyze information (e.g., in the form of observations) collected from various modules (e.g., the observer module 202, external context information module 206, etc.), learn the normal operational behaviors of the mobile device, generate behavior models of the mobile device's behaviors, and compare the generated models to information/observations received from the observer module 202 to identify suspicious mobile device behaviors.

As mentioned above, the observer module 202 may monitor/observe mobile device operations and events. In various aspects, observing mobile device operations and events may include collecting information pertaining to any or all of library API calls in an application framework or run-time libraries, system call APIs, file-system and networking sub-system operations, device (including sensor devices) state changes, and other similar events. In an aspect, the observer module 202 may monitor file system activity, which may include searching for filenames, categories of file accesses (personal info or normal data files), creating or deleting files (e.g., type exe, zip, etc.), file read/write/seek operations, changing file permissions, etc. In an aspect, the observer module 202 may monitor data network activity, which may include types of connections, protocols, port numbers, server/client that the device is connected to, the number of connections, volume or frequency of communications, etc. In an aspect, the observer module 202 may monitor phone network activity, which may include monitoring the type and number of calls or messages (e.g., SMS, etc.) sent out, received, or intercepted (e.g., the number of premium calls placed). In an aspect, the observer module 202 may monitor the system resources that are used, which may include monitoring the number of forks, memory uses, number of files open, etc. In an aspect, the observer module 202 may monitor the device state, which may include monitoring various factors, such as whether the display is on or off, whether the device is locked or unlocked, the amount of battery remaining, the state of the camera, etc. In an aspect, the observer module 202 may also monitor inter-process communications (IPC) by, for example, monitoring intents to crucial services (browser, contracts provider, etc.), the degree of inter-process communications, pop-up windows, etc.

To reduce the number of factors monitored to a manageable level, the observer module 202 may perform coarse observations by monitoring/observing a small subset of the factors that could contribute to the mobile device's degradation, and send the coarse observations to the analyzer module 204. In an embodiment, the initial set of behaviors and/or subset of the factors may be selected by analysis of benign and problematic applications on mobile devices.

The analyzer module 204 may receive the coarse observations from the observer module 202 and identify subsystems, processes, and/or applications associated with the received coarse observations that may potentially contribute to the mobile device's degradation. This may be achieved by, for example, the analyzer module 204 comparing the received information with contextual information received from the external context information module 206.

The analyzer module 204 may instruct the observer module 202 to perform or enable deeper logging/observations or final logging on the identified subsystems, processes or applications. The observer module 202 may perform deeper observations on the identified subsystems, processes or applications. The observer module 202 may send the results of the deeper observations to the analyzer module 204 for further (and deeper) analysis. These operations may be repeated until the source of a problem is identified or until it is determined that the identified subsystems, processes or applications are not likely to cause problems or degradation. The analyzer module 204 may then send the results of the analysis to the actuation module 208, which may receive the results and perform operations to heal, cure, isolate, or otherwise fix the identified problem.

In an aspect, the observer module 202 and the analyzer module 204 may provide, either individually or collectively, real-time behavior analysis of the computing system's behaviors to identify suspicious behavior from limited and coarse observations, to dynamically determine behaviors to observe in greater detail, and to dynamically determine the level of detail required for the observations. In this manner, the observer module 202 enables the computing system 200 to efficiently identify and prevent problems from occurring on mobile devices without requiring a large amount of processor, memory, or battery resources on the device.

In an aspect, the observer module 202 may store the observations in a space efficient and query-service-time efficient manner to reduce the performance-impact on benign applications. The observer module 202 may provide the system with various observer modes to enable multi-level logging (e.g., fine grained and coarse-grained logging). The observer module 202 may provide the ability to automatically and dynamically switch between the different observer modes. The observer module 202 may monitor and restrict process/application that may exhaust system resources. The observer module 202 may manage communications (e.g., non-secure to secure world) overhead, such that the overhead is minimal and flow control is maintained/performed efficiently.

In an aspect, the analyzer module 204 may be configured to receive and analyze information collected by various mobile device sub-systems and/or over various time periods to learn the normal operational behaviors of the mobile device under a variety of contexts and conditions, and generate models of normal mobile device behaviors under the various contexts/conditions. In an aspect, the analyzer module 204 may be configured to correlate the received observations against the generated behavior models, and perform behavior analysis operations based on the correlations to determine whether the received observations conflict with (or do not match) the learned normal operational behaviors.

In various aspects, the mobile device may be configured to communicate with a network server, which may generate data/behavior models based on information received from a cloud service network server. The network server may send the generated data/behavior models to the mobile device, which may receive and implement, apply, or use lean data/behavior models to identify suspicious or performance-degrading mobile device behaviors, software applications, processes, etc. The mobile device may then correct or prevent the identified performance-degrading mobile device behaviors from degrading the performance and power utilization levels of the mobile device.

In various aspects, the network server may be configured to generate or update the data/behavior models by performing, executing, and/or applying machine learning and/or context modeling techniques to behavior information and/or results of behavior analyses provided by many mobile devices. Thus, the network server may receive a large number of reports from many mobile devices and analyze, consolidate or otherwise turn such crowd-sourced information into useable information, particularly a data set or behavior model that can be used and/or accessed by many mobile devices. The network server may continuously reevaluate existing data/behavior models as new behavior/analysis reports are received from mobile devices, and/or generate new or updated data/behavior models based on historical information (e.g., collected from prior executions, previous applications of behavior models, etc.), new information, machine learning, context modeling, and detected changes in the available information, mobile device states, environmental conditions, network conditions, mobile device performance, battery consumption levels, etc.

Figure 3:
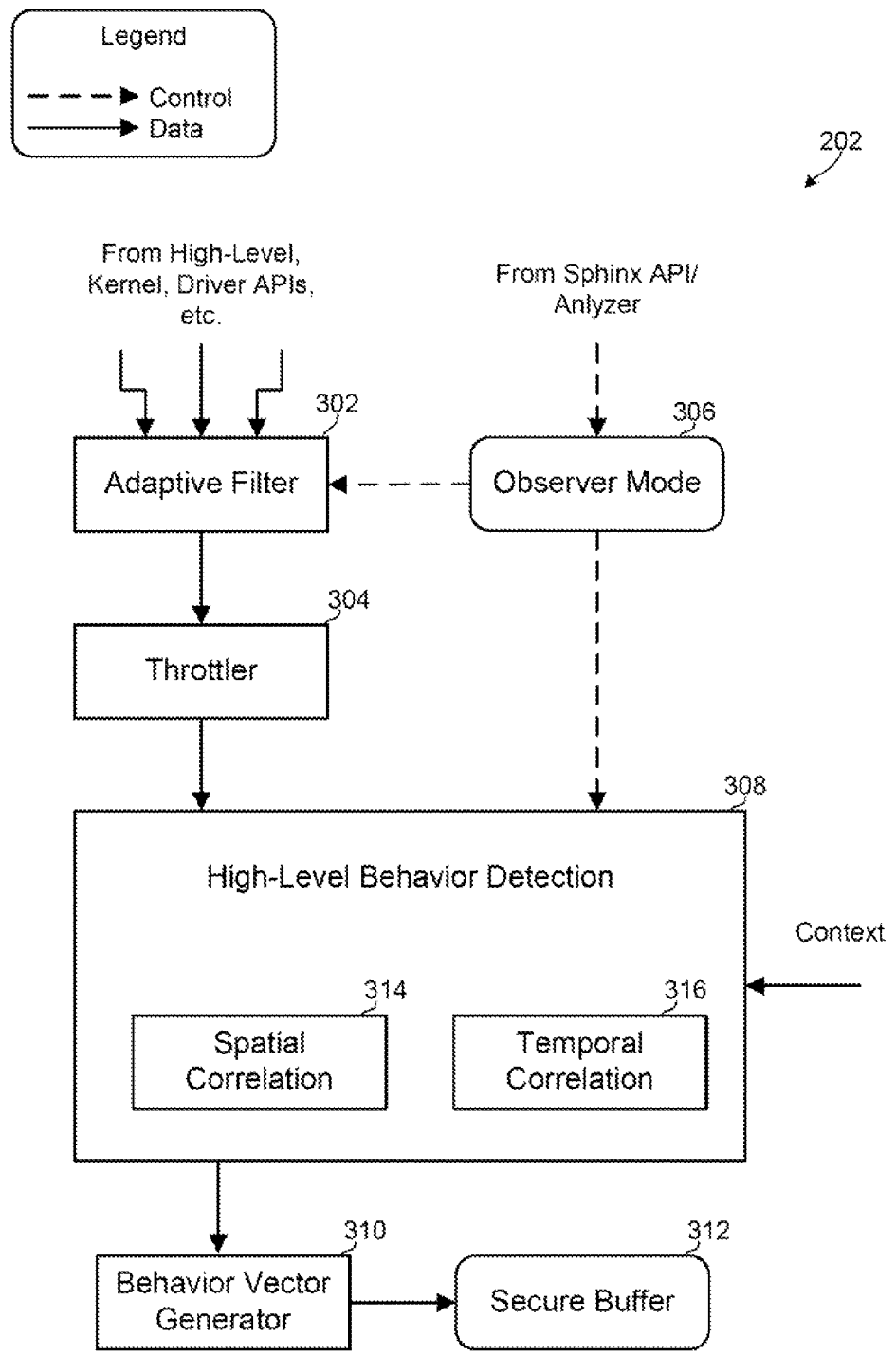
FIG. 3 is a block diagram illustrating example logical components and information flows in an observer module configured to perform dynamic and adaptive observations in accordance with an aspect.

FIG. 3 illustrates example logical components and information flows in an observer module 202 of a computing system configured to perform dynamic and adaptive observations in accordance with an aspect. The observer module 202 may include an adaptive filter module 302, a throttle module 304, an observer mode module 306, a high-level behavior detection module 308, a behavior vector generator 310, and a secure buffer 312. The high-level behavior detection module 308 may include a spatial correlation module 314 and a temporal correlation module 316.

The observer mode module 306 may receive control information from various sources, which may include an analyzer unit (e.g., the analyzer module 204 described above with reference to FIG. 2) and/or an application API. The observer mode module 306 may send control information pertaining to various observer modes to the adaptive filter module 302 and the high-level behavior detection module 308.

The adaptive filter module 302 may receive data/information from multiple sources, and intelligently filter the received information to generate a smaller subset of information selected from the received information. This filter may be adapted based on information or control received from the analyzer module, or a higher-level process communicating through an API. The filtered information may be sent to the throttle module 304, which may be responsible for controlling the amount of information flowing from the filter to ensure that the high-level behavior detection module 308 does not become flooded or overloaded with requests or information.

The high-level behavior detection module 308 may receive data/information from the throttle module 304, control information from the observer mode module 306, and context information from other components of the mobile device. The high-level behavior detection module 308 may use the received information to perform spatial and temporal correlations to detect or identify high level behaviors that may cause the device to perform at sub-optimal levels. The results of the spatial and temporal correlations may be sent to the behavior vector generator 310, which may receive the correlation information and generate a behavior vector that describes the behaviors of particular process, application, or sub-system. In an aspect, the behavior vector generator 310 may generate the behavior vector such that each high-level behavior of a particular process, application, or sub-system is an element of the behavior vector. In an aspect, the generated behavior vector may be stored in a secure buffer 312. Examples of high-level behavior detection may include detection of the existence of a particular event, the amount or frequency of another event, the relationship between multiple events, the order in which events occur, time differences between the occurrence of certain events, etc.

In the various aspects, the observer module 202 may perform adaptive observations and control the observation granularity. That is, the observer module 202 may dynamically identify the relevant behaviors that are to be observed, and dynamically determine the level of detail at which the identified behaviors are to be observed. In this manner, the observer module 202 enables the system to monitor the behaviors of the mobile device at various levels (e.g., multiple coarse and fine levels). The observer module 202 may enable the system to adapt to what is being observed. The observer module 202 may enable the system to dynamically change the factors/behaviors being observed based on a focused subset of information, which may be obtained from a wide verity of sources.

As discussed above, the observer module 202 may perform adaptive observation techniques and control the observation granularity based on information received from a variety of sources. For example, the high-level behavior detection module 308 may receive information from the throttle module 304, the observer mode module 306, and context information received from other components (e.g., sensors) of the mobile device. As an example, a high-level behavior detection module 308 performing temporal correlations might detect that a camera has been used and that the mobile device is attempting to upload the picture to a server. The high-level behavior detection module 308 may also perform spatial correlations to determine whether an application on the mobile device took the picture while the device was holstered and attached to the user's belt. The high-level behavior detection module 308 may determine whether this detected high-level behavior (e.g., usage of the camera while holstered) is a behavior that is acceptable or common, which may be achieved by comparing the current behavior with past behaviors of the mobile device and/or accessing information collected from a plurality of devices (e.g., information received from a crowd-sourcing server). Since taking pictures and uploading them to a server while holstered is an unusual behavior (as may be determined from observed normal behaviors in the context of being holstered), in this situation the high-level behavior detection module 308 may recognize this as a potentially threatening behavior and initiate an appropriate response (e.g., shutting off the camera, sounding an alarm, etc.).

In an aspect, the observer module 202 may be implemented in multiple parts.

Figure 4:
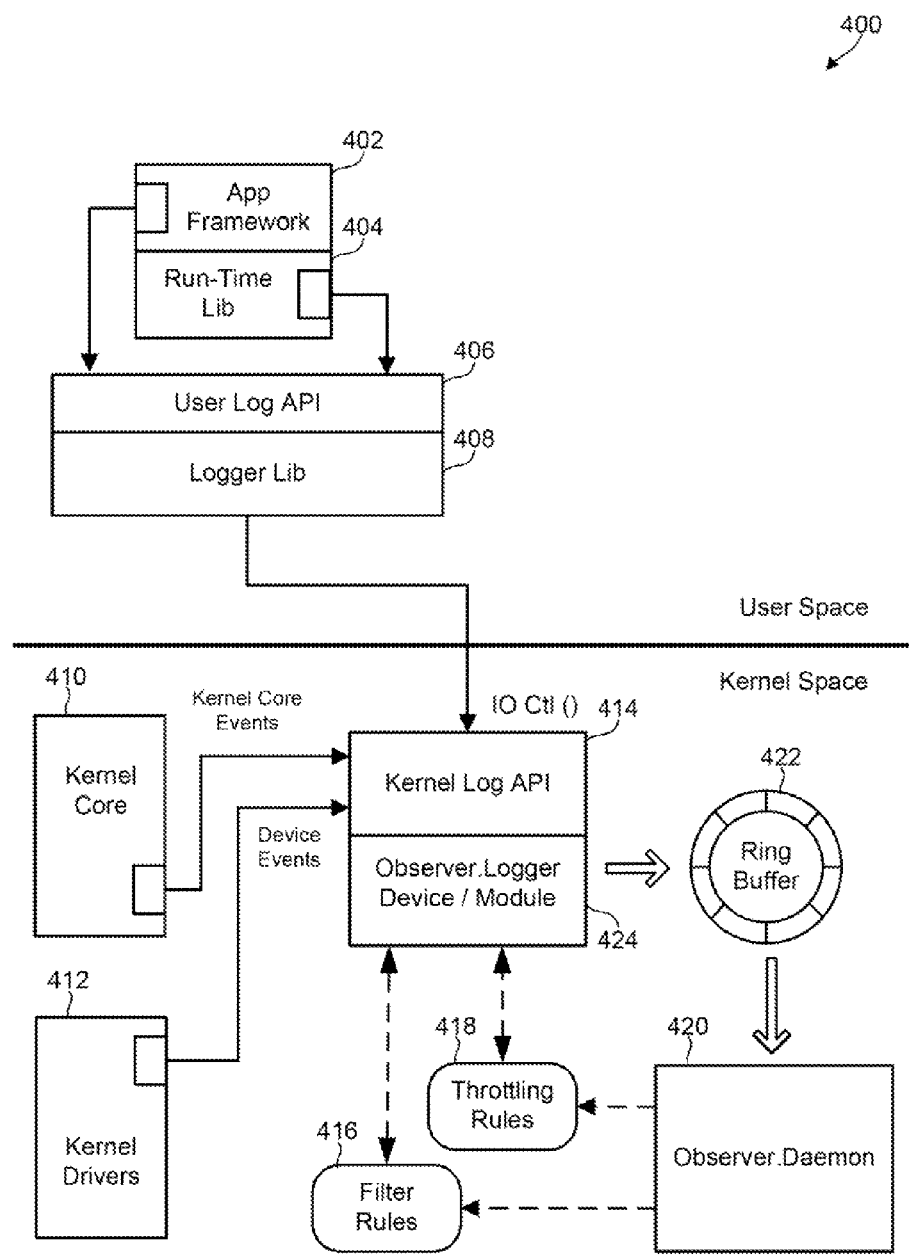
FIG. 4 is a block diagram illustrating logical components and information flows in a computing system implementing observer modules in accordance with an aspect.

FIG. 4 illustrates logical components and information flows in an example computing system 400 implementing an observer module in accordance with an aspect. The illustrated computing system 400 includes an application framework 402, a run time library 404, a user log API 406, and a logger library 408 in the user space. The computing system 400 may include a kernel core 410, kernel drivers 412, a kernel log API 414, an observer logger 424, a filter rules module 416, a throttling rules module 418, a ring buffer 422, and an observer daemon 420 in the kernel space. In an aspect, the ring buffer 422 may be a fixed-sized and/or circular buffer. In an aspect, the combination of the user log API 406 and the kernel log API 414 may constitute the observer logger 424. In an aspect, the combination of the observer daemon 420 and the observer logger 424 may constitute the observer module 202.

The application framework 402 and the run time library 404 may be preexisting software code/components of the mobile device, each of which may be instrumented with logic to monitor activities and send information to the user log API 406 in the user space. The user log API 406 may provide an API that enables the user space applications to communicate with the kernel via the kernel log API 414.

In an aspect, the observer logger 414 may be automatically invoked whenever a particular event, action, or API (e.g., an API identified in a list of APIs as being of particular importance) is invoked, and the corresponding information may be stored in the ring buffer 422. The information stored in the ring buffer 422 may include, for example, information for identifying the caller, information for identifying the exact function being called, the parameters that have been passed to the function call, and other similar information. In an aspect, this information may be stored in the ring buffer 422 in a raw format. Alternatively, the ring buffer 422 may be used to store information after the log has been processed.

The observer logger 424 may be controlled by a set of filter and throttling rules 416, 418. The filter rules 416 may specify whether a particular API is to be logged or not. The throttling rules 418 may specify conditions under which the system is to termination the logging/monitoring of a specific API to prevent overloads.

The filter and throttling rules 416, 418 may be created, updated, and/or maintained by the observer daemon 420. For example, if after observing the mobile device for ten minutes, the observer daemon 428 decides that a particular API is no longer of interest (e.g., it is not providing the system with useful information), the observer daemon 420 may update the filter rules 416 such that events relating to that particular API are no longer monitored/logged.

Figure 5A:
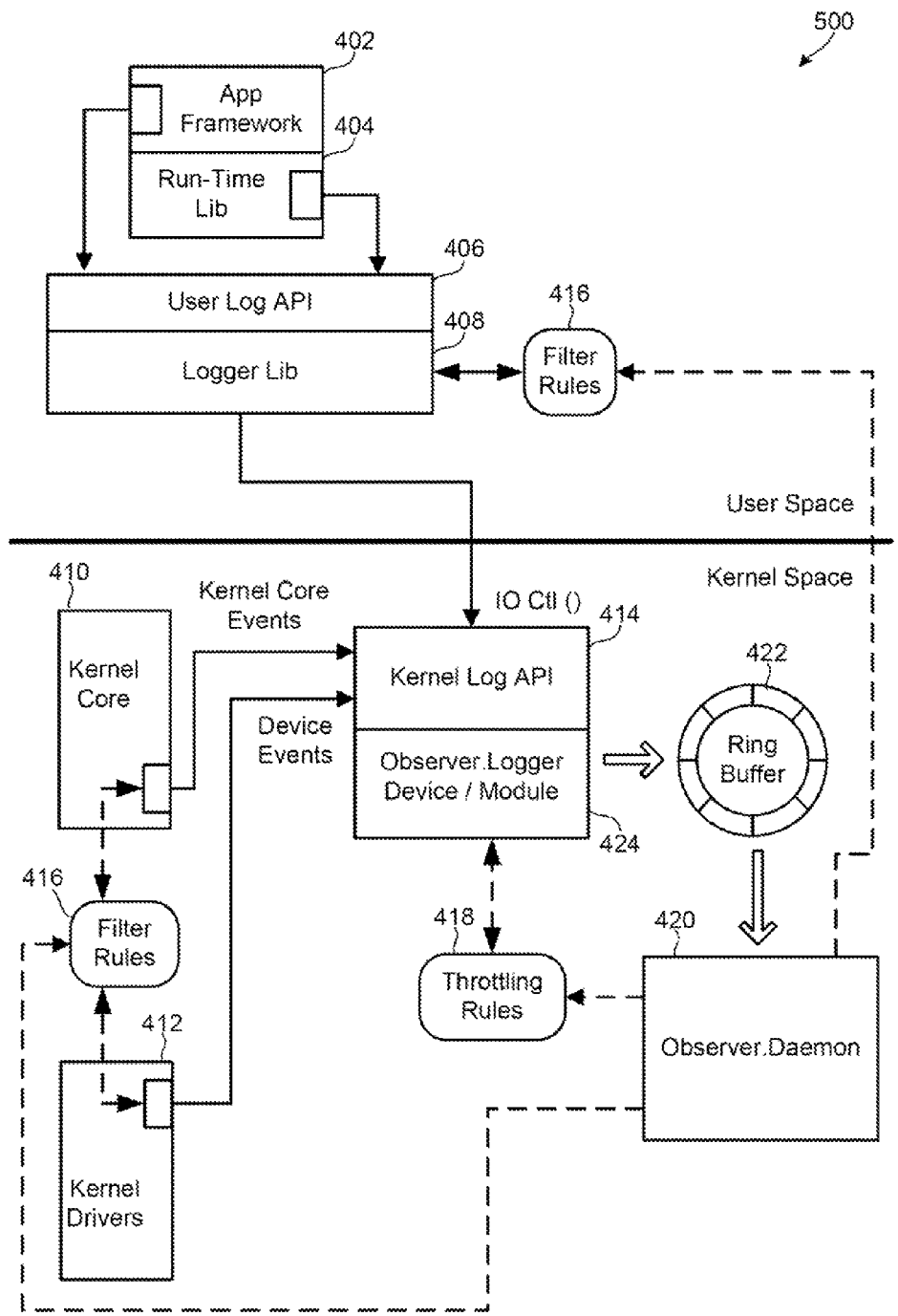
FIG. 5A is a block diagram illustrating logical components and information flows in a computing system implementing observer modules and observer daemons in accordance with the various aspects.

FIG. 5A illustrates logical components and information flows in a computing system 500 implementing an observer module 202 in accordance with another aspect. The computing system 500 illustrated in FIG. 5A includes all the components described above with reference to FIG. 4, except that the filter rules 416 are enforced on the user log API 406 in the user space and/or kernel space on the device. Thus, instead of each call coming to the observer logger 424 and the observer logger 424 deciding whether the call should be logged or not (as described with reference to FIG. 4), the filter rules 416 may be implemented within the instrumentations (e.g., user log API, etc.) such that the call itself will not reach the logger based on the filter rules 416. Implementing the configuration illustrated in FIG. 5A may further improve the mobile device efficiency because function calls do not need to be made to a logger inside the kernel.

Figure 5B:
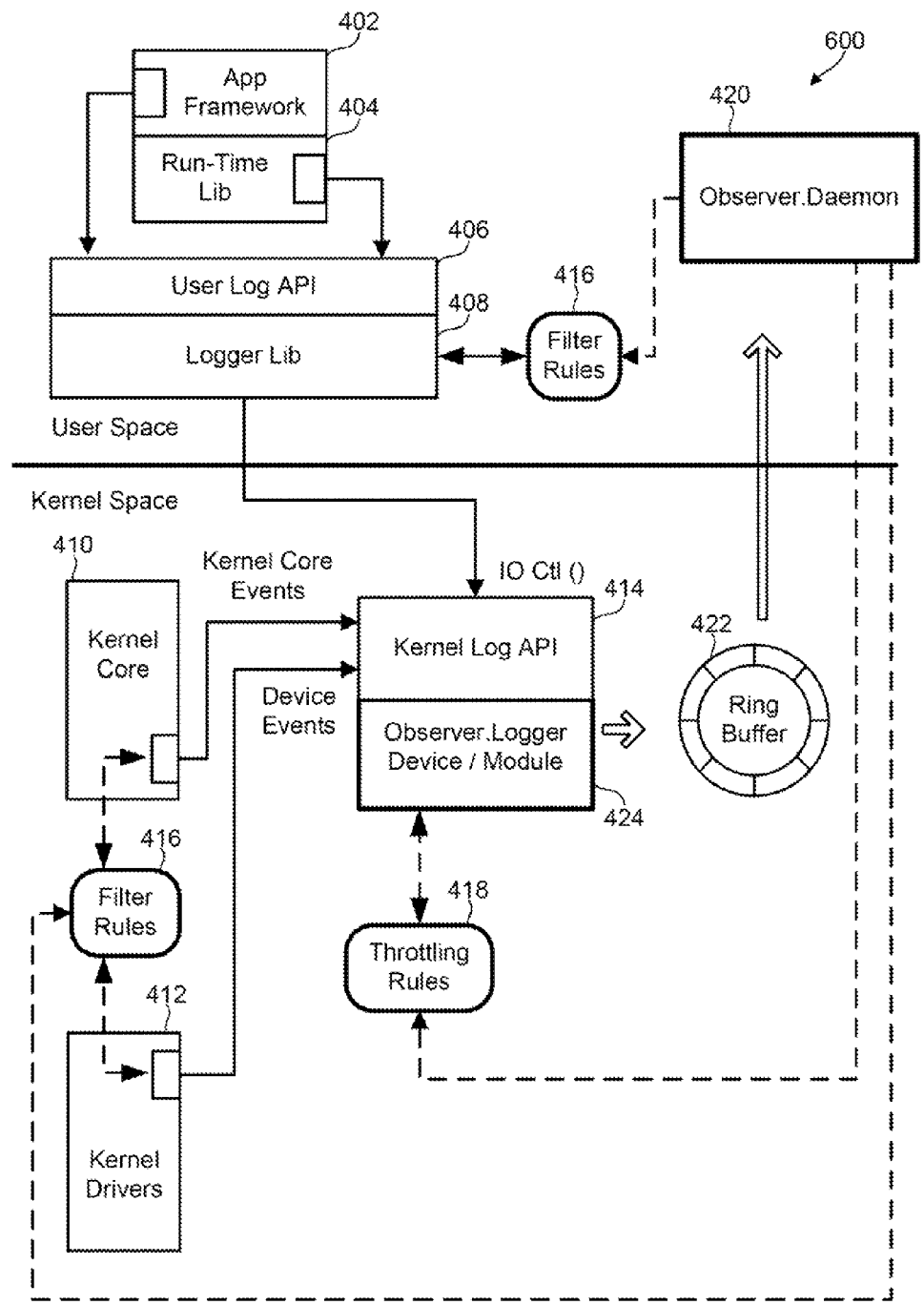
FIG. 5B is a block diagram block diagrams illustrating logical components and information flows in a computing system implementing observer modules and observer daemons in accordance with the various aspects.

FIG. 5B illustrates logical components and information flows in a computing system 550 implementing an observer module in accordance with yet another aspect. The computing system 550 illustrated in FIG. 5B includes all the components described above with reference to FIG. 5A, except that the observer daemon 420 is in the user space. In an aspect, the observer daemon 420, filter rules 416, throttling rules 418, and observer logger 424 may be part of the same component. Implementing the configuration illustrated in FIG. 5B may further improve the mobile device efficiency because the observer daemon 420 may update the filter rules without functions calls into the kernel space.

Figure 6A:
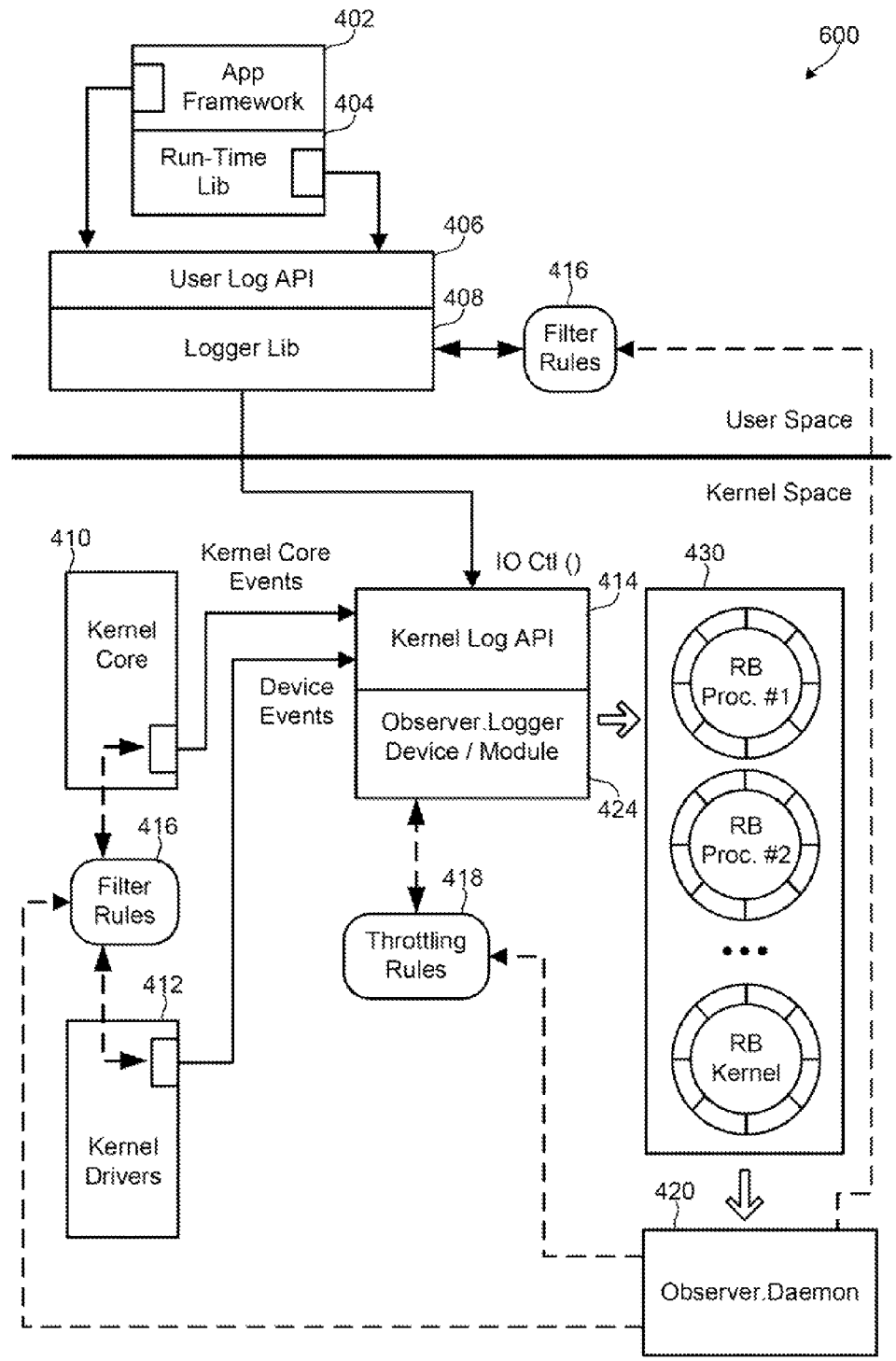
FIG. 6A is a block diagram illustrating logical components and information flows in a computing system implementing observer modules and observer daemons in accordance with the various aspects.
Figure 6B:
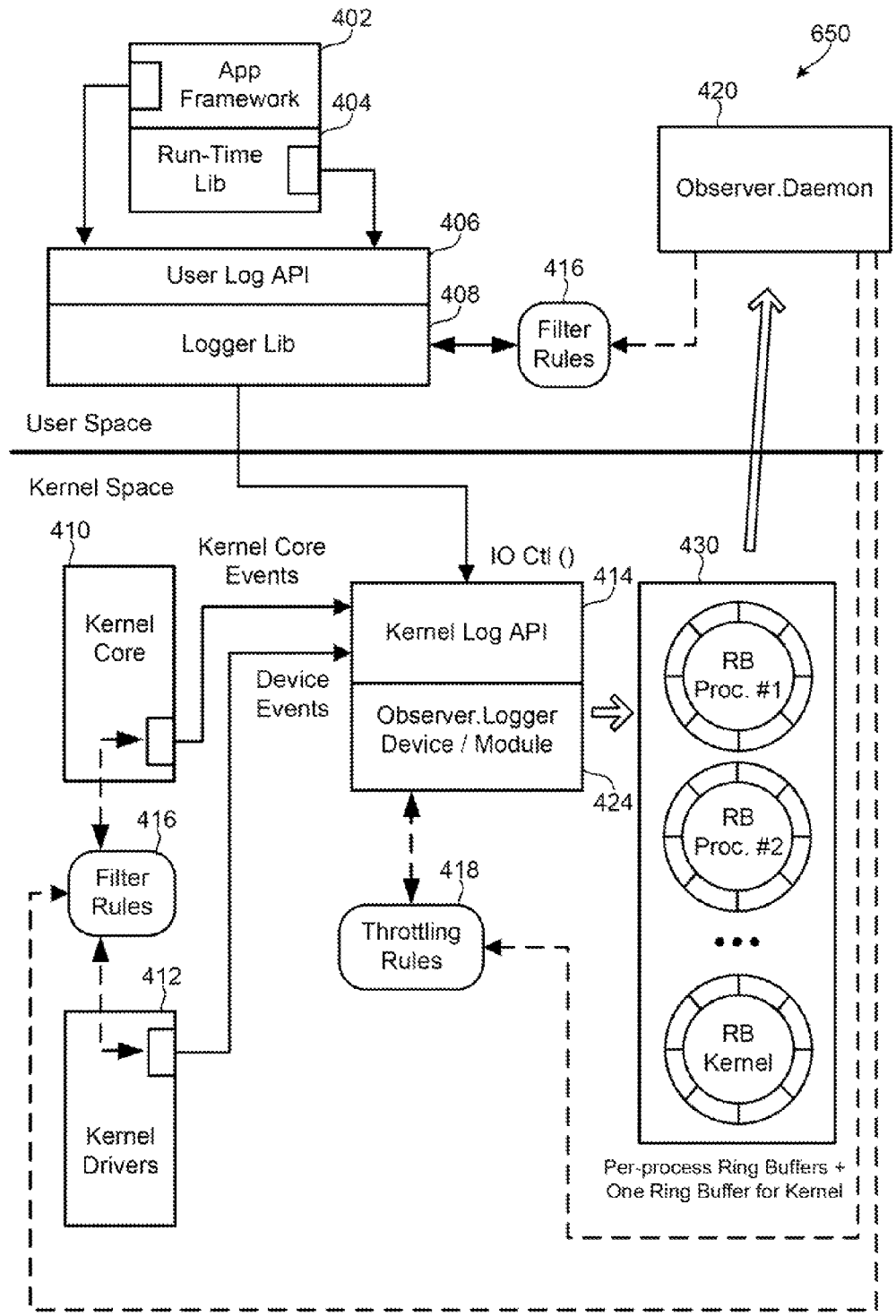
FIG. 6B is a block diagram illustrating logical components and information flows in a computing system implementing observer modules and observer daemons in accordance with the various aspects.

At any given time, several applications and several kernel threads may be attempting to store/write information in the ring buffer, which may cause contention issues that hinder scalability. In an aspect, the system's scalability may be improved via the inclusion of multiple ring buffers, as illustrated in FIGS. 6A-B. The computing system 600 illustrated in FIG. 6A includes all the components described above with reference to FIG. 5A, but includes multiple ring buffers 430. The computing system 600 may include a ring buffer for each application, throttle, and kernel thread being monitored by the system. For example, the computing system 600 may include a ring buffer for a kernel thread being monitored by the system, and one or more ring buffers for each application and/or throttle being monitored by the system. Alternatively, the computing system 600 may include a ring buffer for groups of applications, groups of throttles, and/or groups of kernel threads being monitored by the system. The inclusion of multiple ring buffers enables the computing system 600 to avoid contention issues from arising and reduces bottle necks.

The computing system 650 illustrated in FIG. 6B includes all the components described above with reference to FIG. 6A, except that the observer daemon 420 is in the user space. Implementing the configuration illustrated in FIG. 6B may further improve the mobile device efficiency because the observer daemon 420 may update the filter rules without functions calls into the kernel space.

Figure 7A:
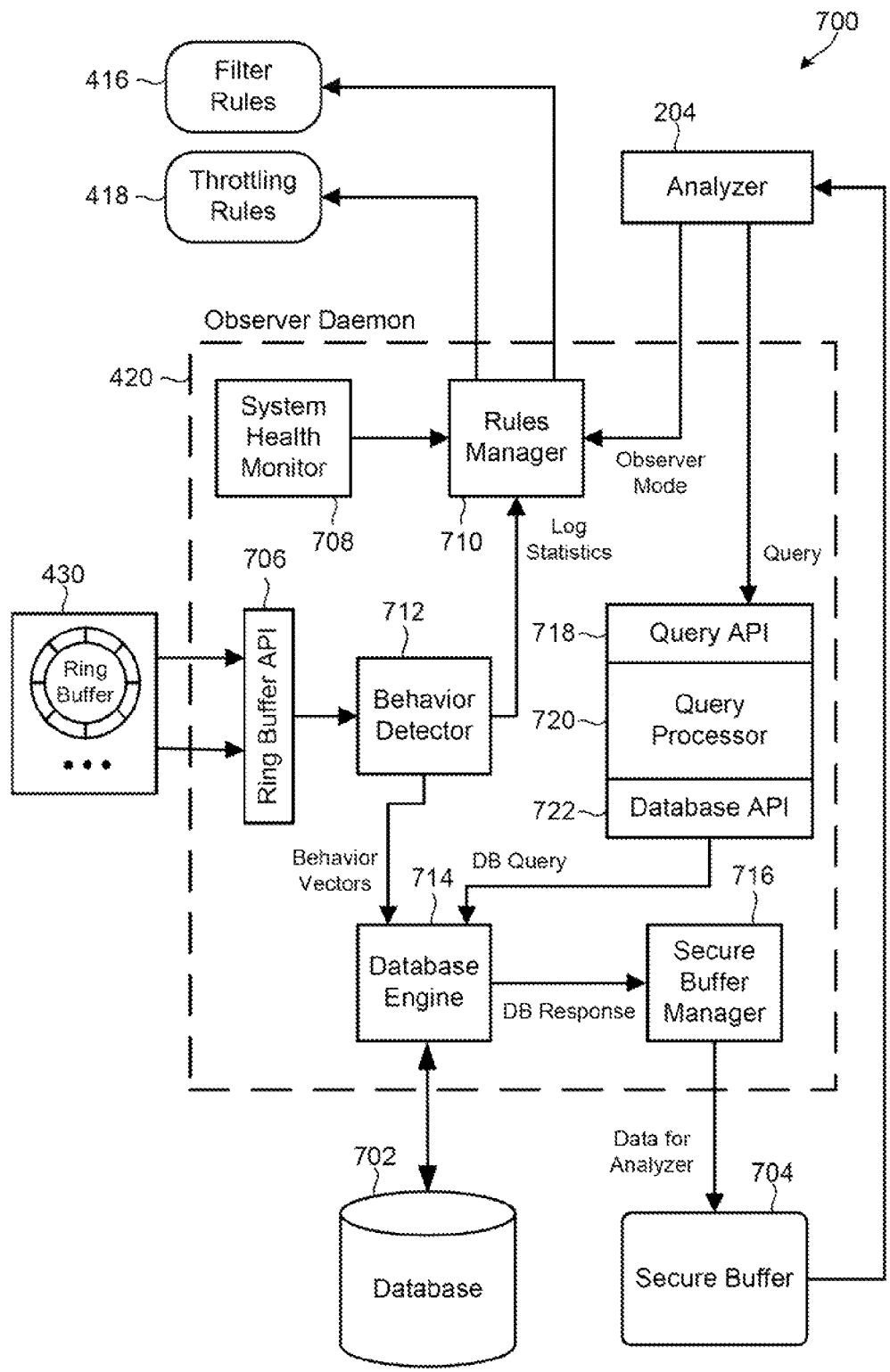
FIG. 7A is a block diagram illustrating logical components and information flows in a computing system implementing observer modules and observer daemons in accordance with the various aspects.

FIG. 7A illustrates logical components and information flows in a computing system 700 implementing an aspect observer daemon 420. The computing system 700 may include an analyzer component (e.g., the analyzer module 204 illustrated in FIG. 2), a filter rules 416 component, a throttling rules 418 component, multiple ring buffers 430, a database 702, a secure buffer 704, and an observer daemon 420. The observer daemon 420 may include a ring buffer API 706, system health monitor 708, a behavior detector 712, a database engine 714, a rules manager 710, a secure buffer manager 716, a query processor 720, a query API 718, a database API 722. A logger (not illustrated) may store information in the ring buffers 430. The observer daemon 420 may extract the information from the ring buffers 430 via the ring buffer API 706. The behavior detector 712 may receive information from the ring buffer API 706, and perform correlation and formatting operations on the received data to generate a behavior vector.

The generated behavior vector may be sent to the database engine 714 for storing in the database 702. The database engine 714 may manage all of the specificities of the database implementation (e.g., kind of data structure that is implemented, types of information included in the data structure, etc.).

The rules manager 710 may be configured to receive inputs from different components (e.g., system health monitor, behavior detection unit, analyzer, etc.), and update the filter and throttle rules 416, 418 based on the received inputs. For example, the rules manager 710 may receive log statistics from the behavior detector 712 and update the filter and throttle rules 416, 418 based on the log statistics.

The system health monitor 708 may be configured to monitor system resources, and inform the rules manager 710 of the system health. For example, the system health monitor 708 may inform the rules manager 710 about the amount of energy that remains stored in the battery, how much memory is available, whether there are enough resources to perform a detailed observation, etc. The rules manager 710 may use the information received from the system health monitor 708 to update the rules. For example, if the system health monitor 708 indicates that the device battery state is below a certain threshold, the rules manager 710 may update the filter rules 416 such that the system performs more coarse observations in order to reduce power consumption.

The query processor 720 may be configured to perform conversions between various API's, such as from a query API 718 to a database-specific API 722.

The secure buffer 704 may enable kernel space components (e.g., in the un-trusted region) to communicate with the user space components (e.g., in the trusted region).

The secure buffer manager 716 may be configured to control the communications that occur via the secure buffer 704.

The database engine 714 may be configured to store the database response to the secure buffer manager 716, which may perform flow control operations and store the information in the secure buffer 704.

The information generated by the observer daemon 420 may be utilized by an analyzer 204, which may be implemented in the kernel space, user space, or in a trusted computing base of a system-on-chip (SOC).

Figure 7B:
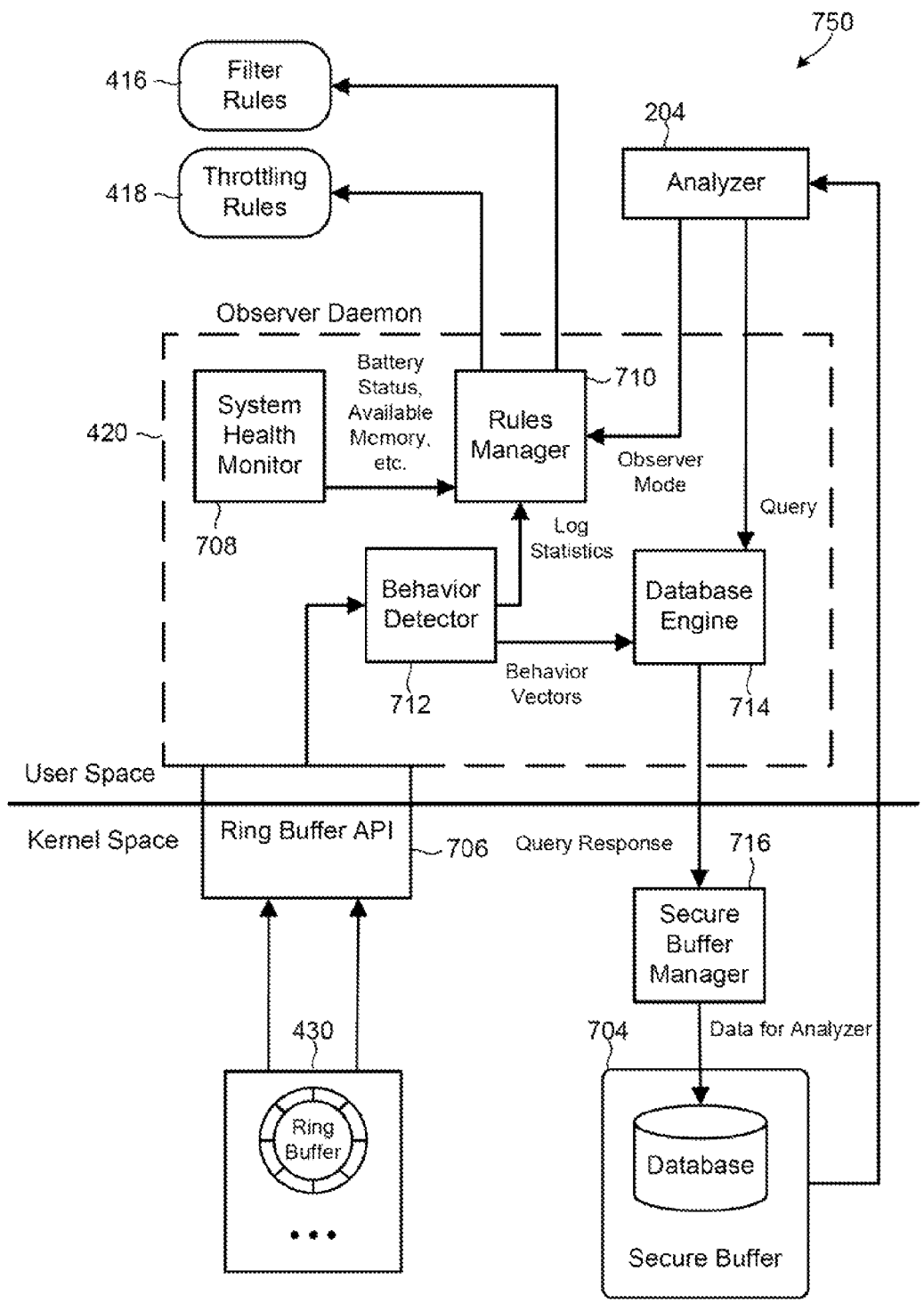
FIG. 7B is a block diagram illustrating logical components and information flows in a computing system implementing observer modules and observer daemons in accordance with the various aspects.

FIG. 7B illustrates logical components and information flows in a computing system 750 implementing another aspect observer daemon 420. The computing system 750 may include an analyzer 204 component, a filter rules 416 component, a throttling rules 418 component, multiple ring buffers 430, a secure buffer 704, a secure buffer manager 716, and an observer daemon 420. The observer daemon 420 may include a ring buffer API 706, system health monitor 708, a behavior detector 712, a database engine 714, and a rules manager 710. A logger (not illustrated) may store information in the ring buffers 430. The computing system 750 may perform the same operations as the computing system 700 illustrated in FIG. 7A, except that the secure buffer manager 716 is in the kernel space and may control the data that is sent to an analyzer 204 in the user space.

Figure 8A:
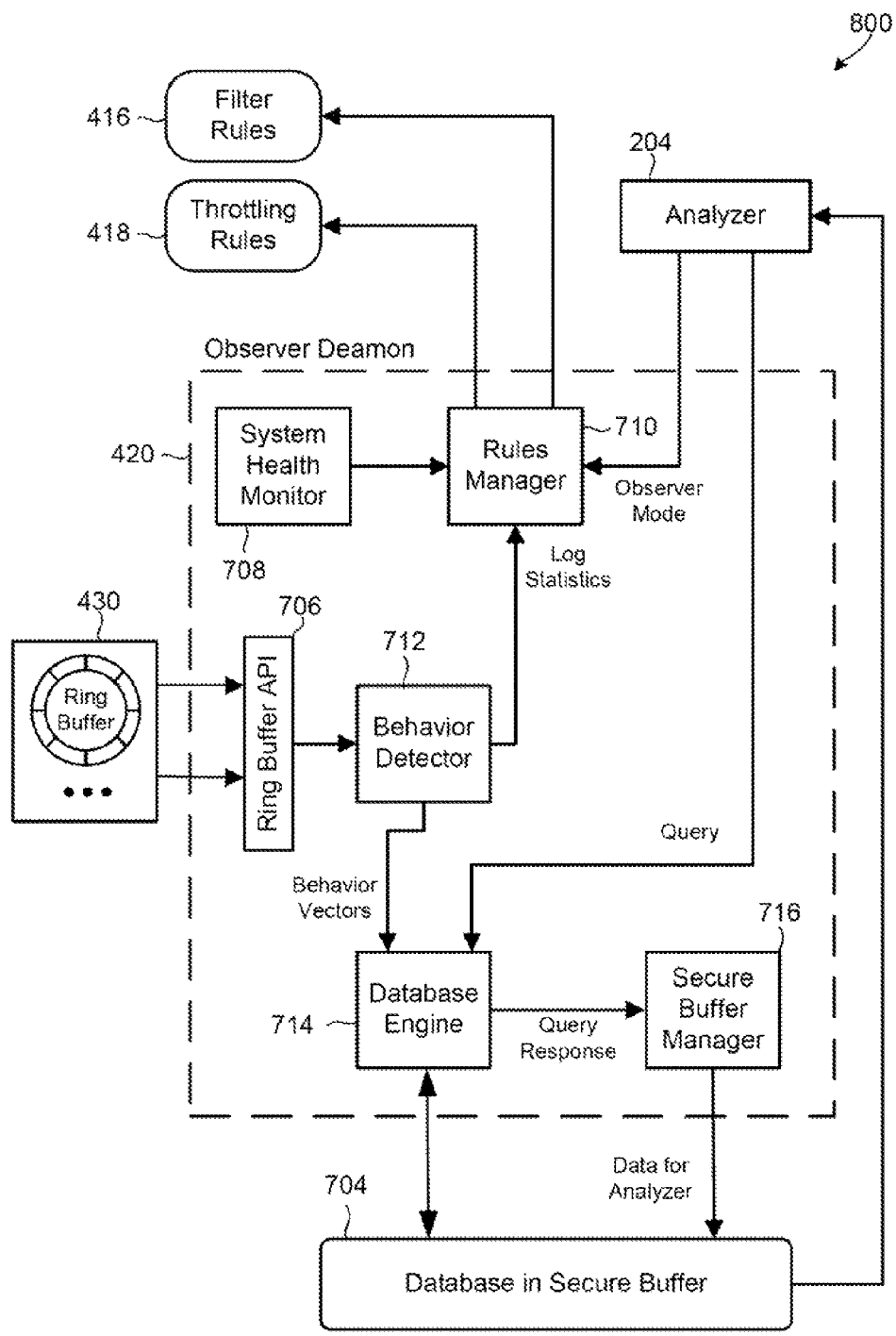
FIG. 8A is a block diagram illustrating logical components and information flows in a computing system implementing observer modules and observer daemons in accordance with the various aspects.

FIG. 8A illustrates logical components and information flows in a computing system 800 implementing another aspect observer daemon. The computing system 800 illustrated in FIG. 8A includes all of the components described above with reference to FIG. 7A, except for a query processor because the database in this aspect is included as part of the secure buffer. In this configuration, whenever the analyzer issues a query, the query may come directly from the database engine. Similarly, responses to the query may be sent directly from the secure buffer to the analyzer.

Figure 8B:
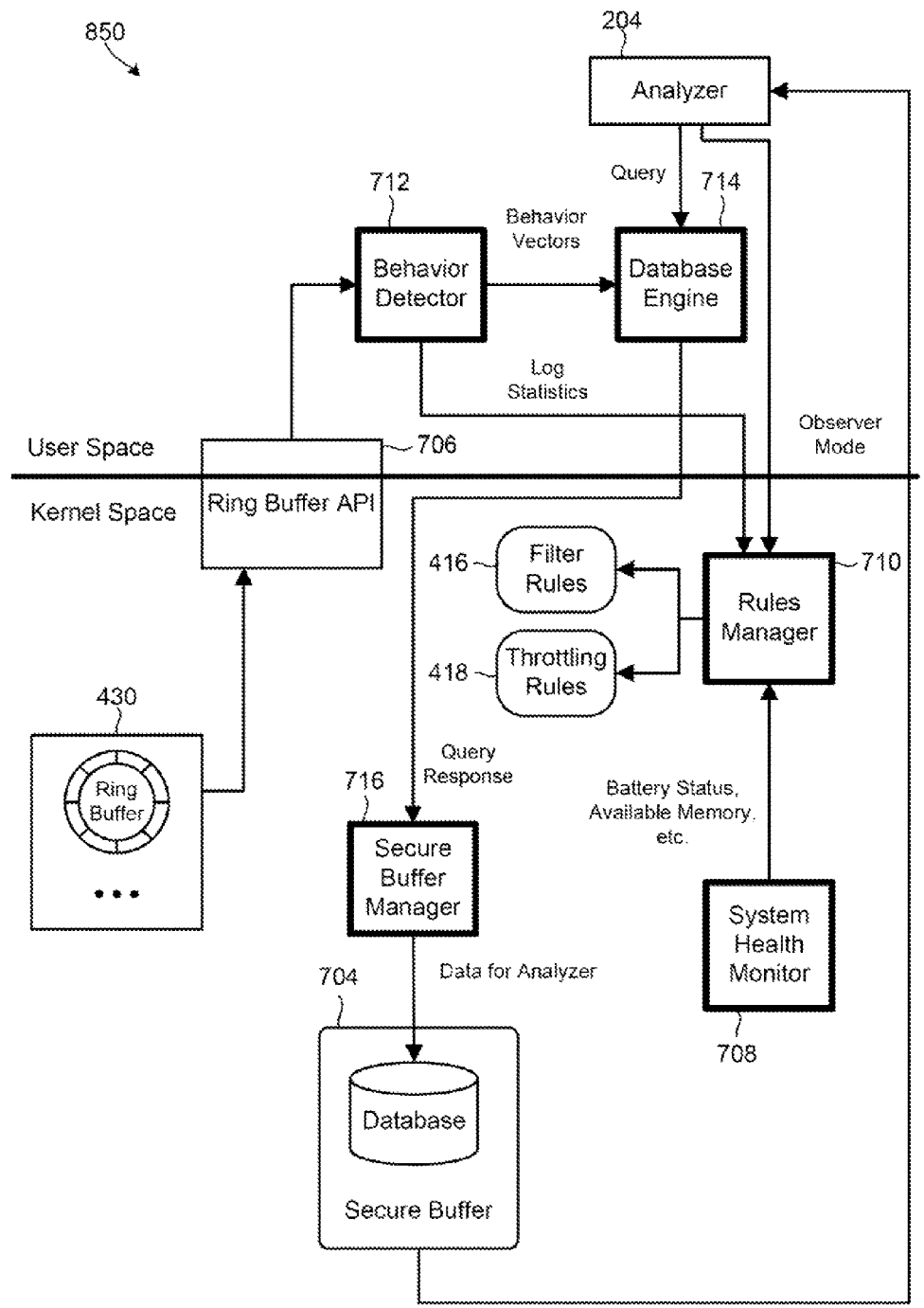
FIG. 8B is a block diagram illustrating logical components and information flows in a computing system implementing observer modules and observer daemons in accordance with the various aspects.

FIG. 8B illustrates logical components and information flows in a computing system 800 implementing yet another aspect observer daemon. In the example illustrated in FIG. 8B, the observer daemon includes a behavior detector 712 and a database engine 714 in the user space, and a secure buffer manager 716, a rules manager 710, and a system health monitor 708 in the kernel space.

The various aspects provide cross-layer observations on mobile devices encompassing webkit, SDK, NDK, kernel, drivers, and hardware in order to characterize system behavior. The behavior observations may be made in real time.

An important feature of the various aspects is that the observer module may perform adaptive observation techniques and control the observation granularity. As discussed above, there are a large number (i.e., thousands) of factors that could contribute to the mobile device's degradation, and it may not be feasible to monitor/observe all of the different factors that may contribute to the degradation of the device's performance. To overcome this, the various aspects dynamically identify the relevant behaviors that are to be observed, and dynamically determine the level of detail at which the identified behaviors are to be observed.

Figure 9A:
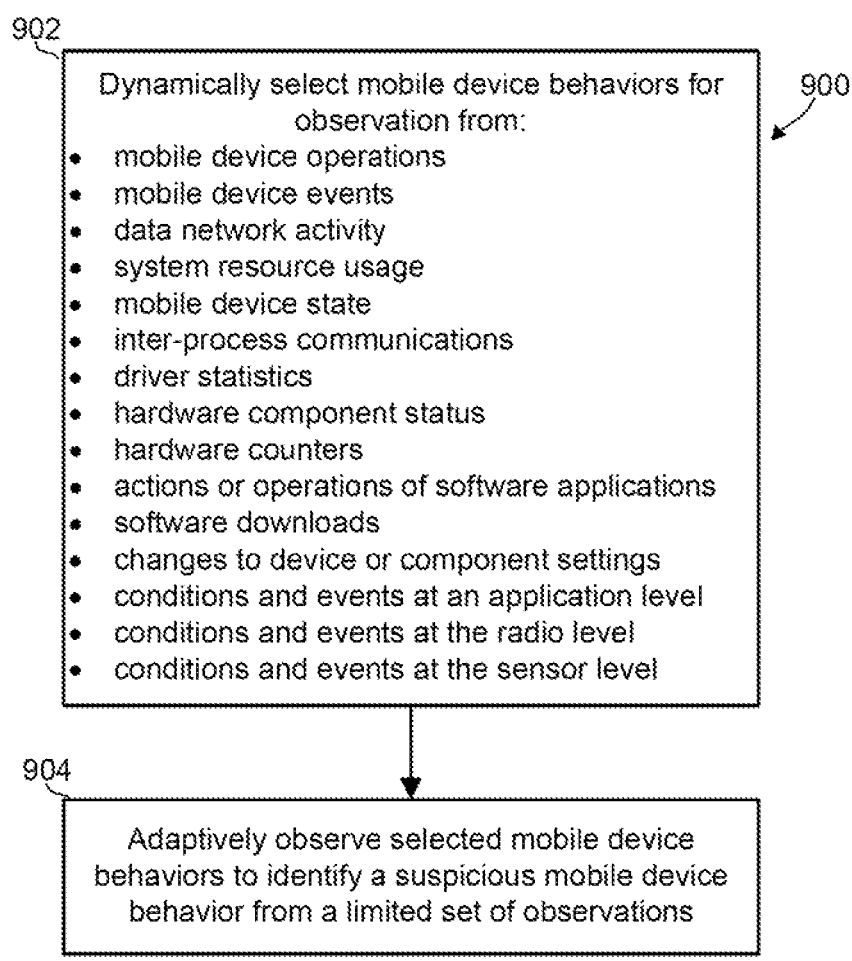
FIG. 9A is a process flow diagram illustrating an aspect method for performing adaptive observations on mobile devices.

FIG. 9A illustrates an aspect method 900 for dynamically selecting mobile device behaviors for observation in order to identify suspicious mobile device behaviors. In block 902, the mobile device processor may select for observation mobile device behaviors and/or states that will be observed. This selection of device behaviors and/or states may include the selection of a subset of a wide range of behaviors, actions and states. Thus, the selection in block 902 may be one or more of mobile device operations, mobile device events, data network activity, system resource usage, mobile device state, inter-process communications, driver statistics, hardware component status, hardware counters, actions or operations of software applications, software downloads, changes to device or component settings, conditions and events at an application level, conditions and events at the radio level, and conditions and events at the sensor level. In block 904, the mobile device may begin observing the selected device behaviors and/or states and process the observations in order to identify suspicious mobile device behaviors. Since only the selected subset of device behaviors and/or states are observed, this enables the processor to detect suspicious behaviors based on a limited set of observations.

Examples of mobile device operations that may be selected in block 902 and observed in block 904 include, for example, one or more of library API calls in an application framework or run-time library, system call APIs, file-system and networking sub-system operations, file system activity, searches for filenames, categories of file accesses, creating files, deleting files, file read/write/seek operations, and changing file permissions.

Examples of mobile device events that may be selected in block 902 and observed in block 904 include, for example, device state changes and/or sensor devices state changes.

Examples of mobile device data network activities that may be selected in block 902 and observed in block 904 include, for example, one or more of types of connections, protocols, port numbers, server/client that the device is connected to, the number of connections, volume or frequency of communications, phone network activity, type and number of calls/messages sent, type and number of calls/messages received, type and number of calls/messages intercepted, call information, text messaging information, media messaging, user account information, transmissions, voicemail, and device identifiers (e.g., DeviceIDComm).

Examples of mobile device system resource usage that may be selected in block 902 and observed in block 904 include, for example, monitoring the number of forks, memory access operations, and/or the number of files open.

Examples of mobile device states that may be selected in block 902 and observed in block 904 include, for example, display on/off state, locked/unlocked state, battery charge state, camera state, and microphone state.

Examples of mobile device inter-process communications that may be selected in block 902 and observed in block 904 include, for example, monitoring intents to crucial services (browser, contracts provider, etc.), monitoring the degree of inter-process communications, and monitoring pop-up windows.

Examples of mobile device driver statistics that may be selected in block 902 and observed in block 904 include, for example, statistics from drivers for one or more of cameras, sensors, electronic displays, WiFi communication components, data controllers, memory controllers, system controllers, access ports, peripheral devices, wireless communication components, and external memory chips.

Examples of mobile device driver hardware component status that may be selected in block 902 and observed in block 904 include, for example, cameras, sensors, electronic displays, WiFi communication components, data controllers, memory controllers, system controllers, access ports, timers, peripheral devices, wireless communication components, external memory chips, voltage regulators, oscillators, phase-locked loops, peripheral bridges, and other similar components used to support the processors and clients running on the mobile computing device.

Examples of mobile device hardware counters that may be selected in block 902 and observed in block 904 include, for example, hardware counters that denote the state or status of the mobile computing device and/or mobile device sub-systems, and special-purpose registers of processors/cores that are configured to store a count or state of hardware-related activities or events.

Examples of mobile device driver statistics that may be selected in block 902 and observed in block 904 include, for example, statistics from drivers for one or more of cameras, sensors, electronic displays, WiFi communication components, data controllers, memory controllers, system controllers, access ports, peripheral devices, wireless communication components, and external memory chips.

Examples of mobile device actions or operations of software applications that may be selected in block 902 and observed in block 904 include, for example, monitoring of information used by software applications including one or more of location information, camera information, accelerometer information, browser information, content of browser-based communications, content of voice-based communications, short range radio communications, content of text-based communications, content of recorded audio files, phonebook or contact information, contacts lists, calendar information, location information (LocationComm), recorded audio information, accelerometer information, notifications communicated to and from a software application, user verifications, and a user password.

Examples of mobile device software downloads that may be selected in block 902 and observed in block 904 include, for example, software downloads from an application download server, and a first software application requesting the downloading and/or install of a second software application.

Examples of changes to device or component settings that may be selected in block 902 and observed in block 904 include, for example, changes to one or more of compass information, mobile device settings, battery life, gyroscope information, pressure sensors, and screen activity.

Examples of mobile device conditions and events at the application level that may be selected in block 902 and observed in block 904 include, for example, observing user via facial recognition software, observing social streams, observing notes entered by the user, observing event pertaining to the use of an electronic payment service, such as PassBook/Google Wallet/Paypal, observing events relating to the use of VPNs, synchronization, voice searches, voice control, language translators, offloading of data for computations, video streaming, camera usage without user activity, and microphone usage without user activity.

Examples of mobile device conditions and events at the radio level that may be selected in block 902 and observed in block 904 include, for example, determining the presence, existence or amount of any or all of: user interaction with the mobile device before establishing radio communication links or transmitting information, dual or multiple SIMs or SIM cards, Internet radio, mobile phone tethering, offloading data for computations, device state communications, the use as a game controller or home controller, vehicle communications, mobile device synchronization, monitoring the use of radios (WiFi, WiMax, Bluetooth, etc.) for positioning, peer-to-peer (p2p) communications, synchronization, vehicle to vehicle communications, and/or machine-to-machine (m2m), and monitoring network traffic usage, statistics, or profiles.

Examples of mobile device conditions and events at the events at the sensor level that may be selected in block 902 and observed in block 904 include, for example, monitoring magnet sensors, detecting near-field communications, collecting information from a credit card scanner, barcode scanner, or mobile tag reader, detecting the presence of USB power charging source, detecting that a keyboard or auxiliary device has been coupled to the mobile device, detecting that the mobile device has been coupled to a computing device (e.g., via USB, etc.), determining whether a light emitting diode, flash, flashlight, or light source has been modified or disabled (e.g., maliciously disabling an emergency signaling app, etc.), determining whether a speaker or microphone has been turned on or powered, detecting a charging or power event, detecting that the mobile device is being used as a game controller, collecting information from medical purpose/healthcare sensors or from scanning the user's body, collecting information from an external sensor plugged into the USB/audio jack, collecting information from a tactile or haptic sensor (e.g., via a vibrator interface, etc.), and collecting information pertaining to the thermal state of the mobile device.

Figure 9B:
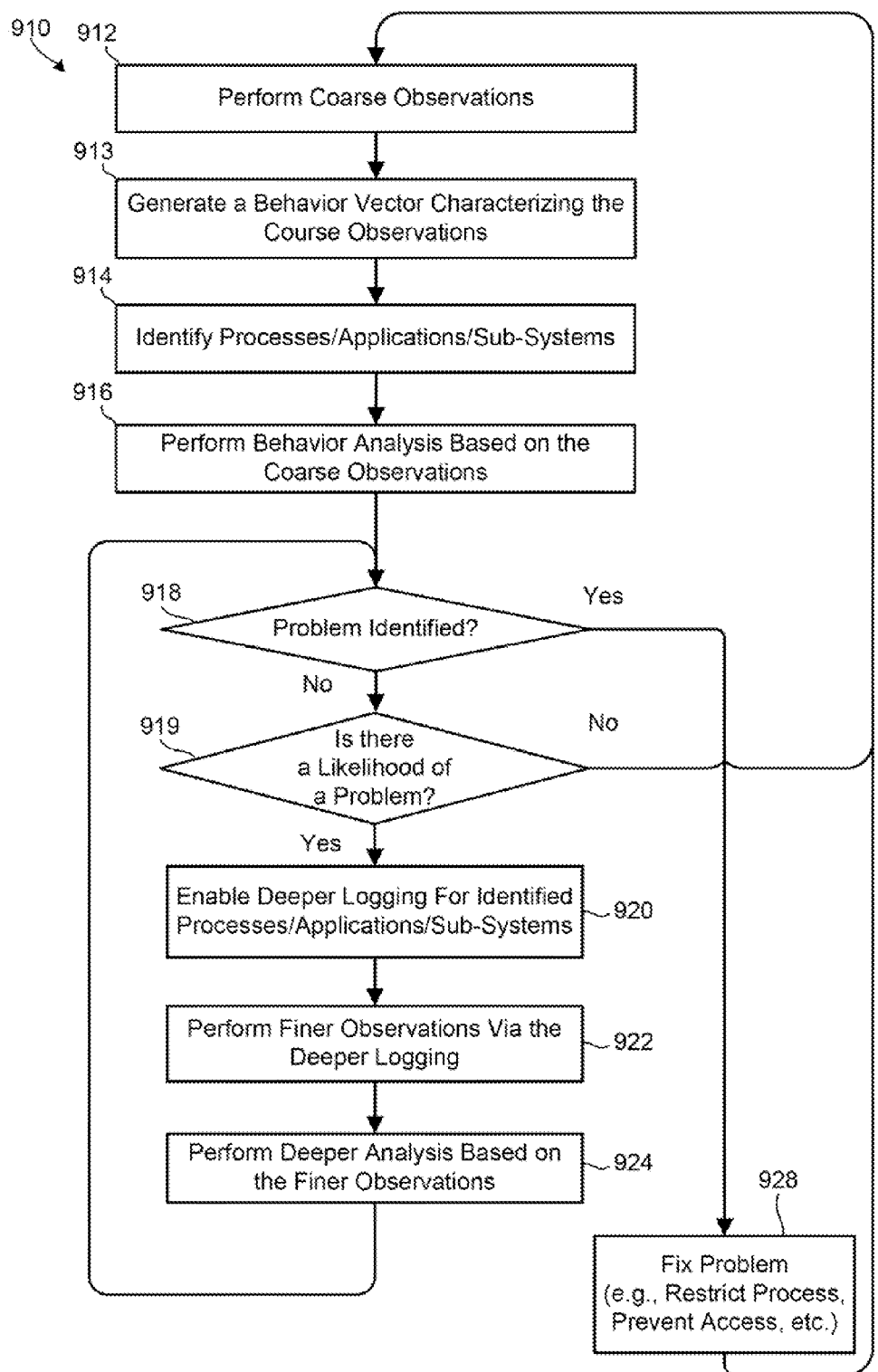
FIG. 9B is a process flow diagram illustrating another aspect method for performing adaptive observations on mobile devices.

FIG. 9B illustrates another example method 910 for performing dynamic and adaptive observations in accordance with an aspect. In block 912, the mobile device processor may perform coarse observations by monitoring/observing a subset of large number factors/behaviors that could contribute to the mobile device's degradation. In block 913, the mobile device processor may generate a behavior vector characterizing the coarse observations and/or the mobile device behavior based on the coarse observations. In block 914, the mobile device processor may identify subsystems, processes, and/or applications associated with the coarse observations that may potentially contribute to the mobile device's degradation. This may be achieved, for example, by comparing information received from multiple sources with contextual information received from sensors of the mobile device. In block 916, the mobile device processor may perform behavioral analysis operations based on the coarse observations. In determination block 918, the mobile device processor may determine whether suspicious behaviors or potential problems can be identified and corrected based on the results of the behavioral analysis. When the mobile device processor determines that the suspicious behaviors or potential problems can be identified and corrected based on the results of the behavioral analysis (i.e., determination block 918="Yes"), in block 928, the processor may initiate a process to correct the behavior and return to block 912 to perform additional coarse observations.

When the mobile device processor determines that the suspicious behaviors or potential problems can not be identified and/or corrected based on the results of the behavioral analysis (i.e., determination block 918="No"), in determination block 919 the mobile device processor may determine whether there is a likelihood of a problem. In an embodiment, the mobile device processor may determine that there is a likelihood of a problem by computing a probability of the mobile device encountering potential problems and/or engaging in suspicious behaviors, and determining whether the computed probability is greater than a predetermined threshold. When the mobile device processor determines that the computed probability is not greater than the predetermined threshold and/or there is not a likelihood that suspicious behaviors or potential problems exist and/or are detectable (i.e., determination block 919="No"), the processor may return to block 912 to perform additional coarse observations.

When the mobile device processor determines that there is a likelihood that suspicious behaviors or potential problems exist and/or are detectable (i.e., determination block 919="Yes"), in block 920, the mobile device processor may perform deeper logging/observations or final logging on the identified subsystems, processes or applications. In block 922, the mobile device processor may perform deeper and more detailed observations on the identified subsystems, processes or applications. In block 924, the mobile device processor may perform further and/or deeper behavioral analysis based on the deeper and more detailed observations. In determination block 918, the mobile device processor may again determine whether the suspicious behaviors or potential problems can be identified and corrected based on the results of the deeper behavioral analysis. When the mobile device processor determines that the suspicious behaviors or potential problems can not be identified and corrected based on the results of the deeper behavioral analysis (i.e., determination block 918="No"), the processor may repeat the operations in blocks 920-924 until the level of detail is fine enough to identify the problem or until it is determined that the problem cannot be identified with additional detail or that no problem exists.

When the mobile device processor determines that the suspicious behaviors or potential problems can be identified and corrected based on the results of the deeper behavioral analysis (i.e., determination block 918="Yes"), in block 928, the mobile device processor may perform operations to correct the problem/behavior, and the processor may return to block 912 to perform additional operations.

In an aspect, as part of blocks 912-928 of method 910, the mobile device processor may perform real-time behavior analysis of the system's behaviors to identify suspicious behavior from limited and coarse observations, to dynamically determine the behaviors to observe in greater detail, and to dynamically determine the precise level of detail required for the observations. This enables the mobile device processor to efficiently identify and prevent problems from occurring, without requiring the use of a large amount of processor, memory, or battery resources on the device.

Figure 10:
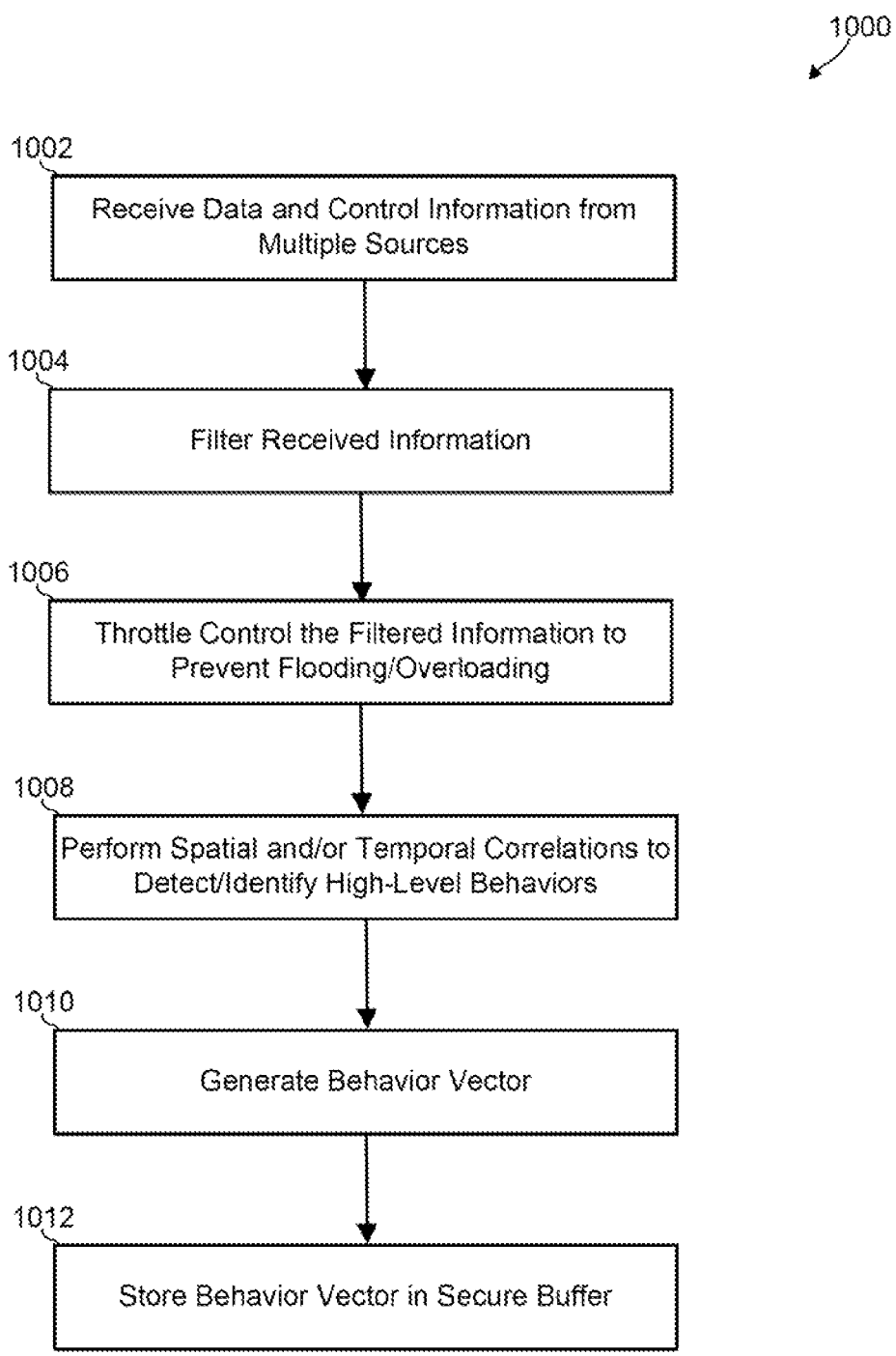
FIG. 10 is a process flow diagram illustrating another aspect method for performing adaptive observations on mobile devices.

FIG. 10 illustrates an example observer method 1000 for performing dynamic and adaptive observations on a mobile device processor in accordance with an aspect. The observer method 1000 may be implemented as part of an observer module in the mobile device's kernel space, user space, or a combination thereof. In block 1002, the observer module operating on the processor may receive data, control, and/or context information from various sources, which may include an analyzer unit (e.g., analyzer module 204 described in FIG. 2), application APIs, Driver APIs, kernel threads, user threads, processes, programs, mobile device sensors, etc. In block 1004, the observer module operating on the processor may adaptively and intelligently filter the received information to generate a smaller subset of the received information. In block 1006, the observer module operating on the processor may throttle control the filtered information to control/prevent flooding or overloading. In block 1008, the observer module operating on the processor may perform spatial and temporal correlations to detect/identify high level behaviors that may cause the device to perform at sub-optimal levels. In block 1010, the observer module operating on the processor may generate a behavior vector that describes the behaviors of particular process, application, or sub-system. In block 1012, the observer module operating on the processor may store the generated behavior vector in a secure buffer.

Figure 11A:
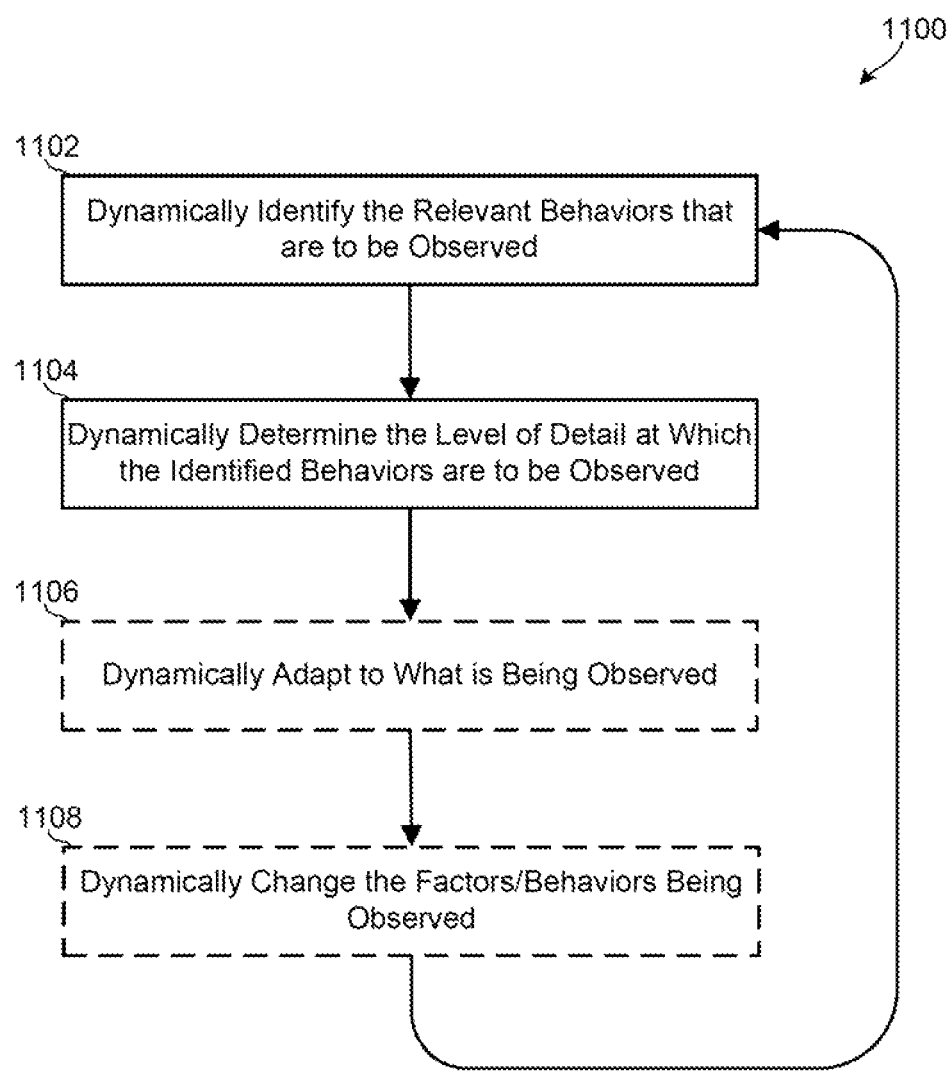
FIGS. 11A-11C are process flow diagrams illustrating further aspect methods for performing adaptive observations on mobile devices.

FIG. 11A illustrates another example method 1100 for performing dynamic and adaptive observations by a mobile device processor in accordance with another aspect. In block 1102, the mobile device processor may dynamically identify the relevant behaviors that are to be observed on the mobile device. In block 1104, the mobile device processor may dynamically determine the level of detail at which the identified behaviors are to be observed. In optional block 1106, the mobile device processor may dynamically adapt to what is being observed. In optional block 1108, the mobile device processor may dynamically change or update the parameters, factors, behaviors, processes, applications, and/or subsystems that are to be observed. The operations of blocks 1102-1108 may be repeated continuously or as is necessary to improve the mobile device performance (e.g., battery power consumption, processing speed, network communication speeds, etc.).

Figure 11B:
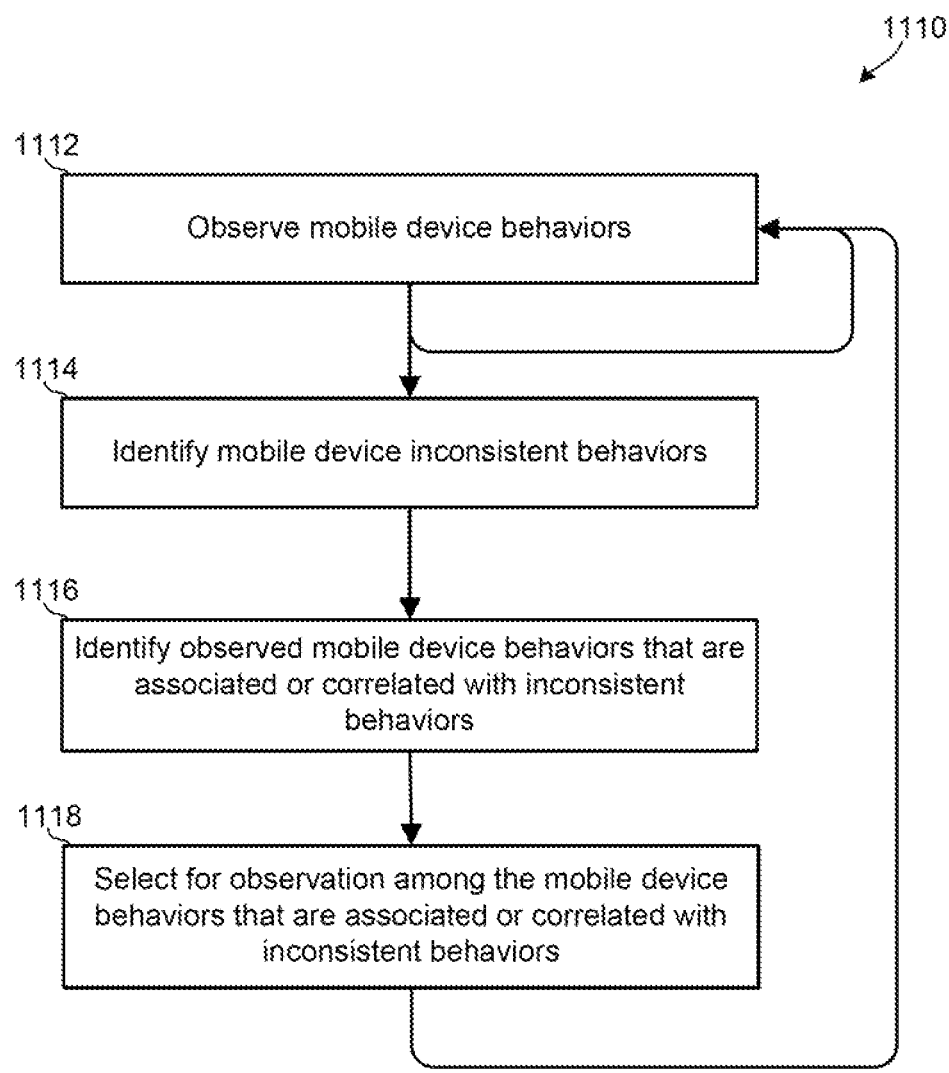

FIG. 11B illustrates an aspect method 1110 that may be performed as part of the operations of block 1102 described above with reference to FIG. 11A. In order to dynamically identify relevant behaviors, the mobile device processor may observe any of the mobile device behaviors described above over a period of time in block 1112. This observation may be for a set period of time or may be cumulative, such as in a continuous learning process. Thus, the longer that the mobile device operates, the more behavioral observations may be collected. In block 1114 the processor may identify inconsistent behaviors of the mobile device, which may be indicative of a performance limiting condition. This may include performing any of the methods described herein. The inconsistent behaviors may be suspicious or potentially performance-degrading mobile device behaviors.

In block 1116, the mobile device processor may correlate or identify associations between the observed mobile device behaviors and identify inconsistent behaviors in order to identify correlations or patterns. For example, the processor may identify those observed mobile device behaviors that occur only during or immediately before identified inconsistent behaviors. As another example, the processor may identify those observed mobile device behaviors that occur frequently (though not necessarily always) during or immediately before identified inconsistent behaviors. As a further example, the processor may identify sets of observed behaviors which only or frequently occur together when inconsistent behaviors are identified. In block 1118, the processor may select mobile device behaviors for observation from among the subset of behaviors that the processor has identified as associated or correlated with inconsistent behaviors. Thus, the selection of mobile device behaviors for observation may be dynamic, and the selection process may improve over time as more mobile device behaviors are observed and more inconsistent behaviors are identified. In this manner, the longer the mobile device operates, the better the processor may be able to identify those few behaviors that are most closely correlated or associated with inconsistent or undesirable behaviors. That is, the longer that the mobile device processor observes these mobile device behaviors, the more accurate its classifications of suspicious or potentially performance-degrading mobile device behaviors become.

Figure 11C:
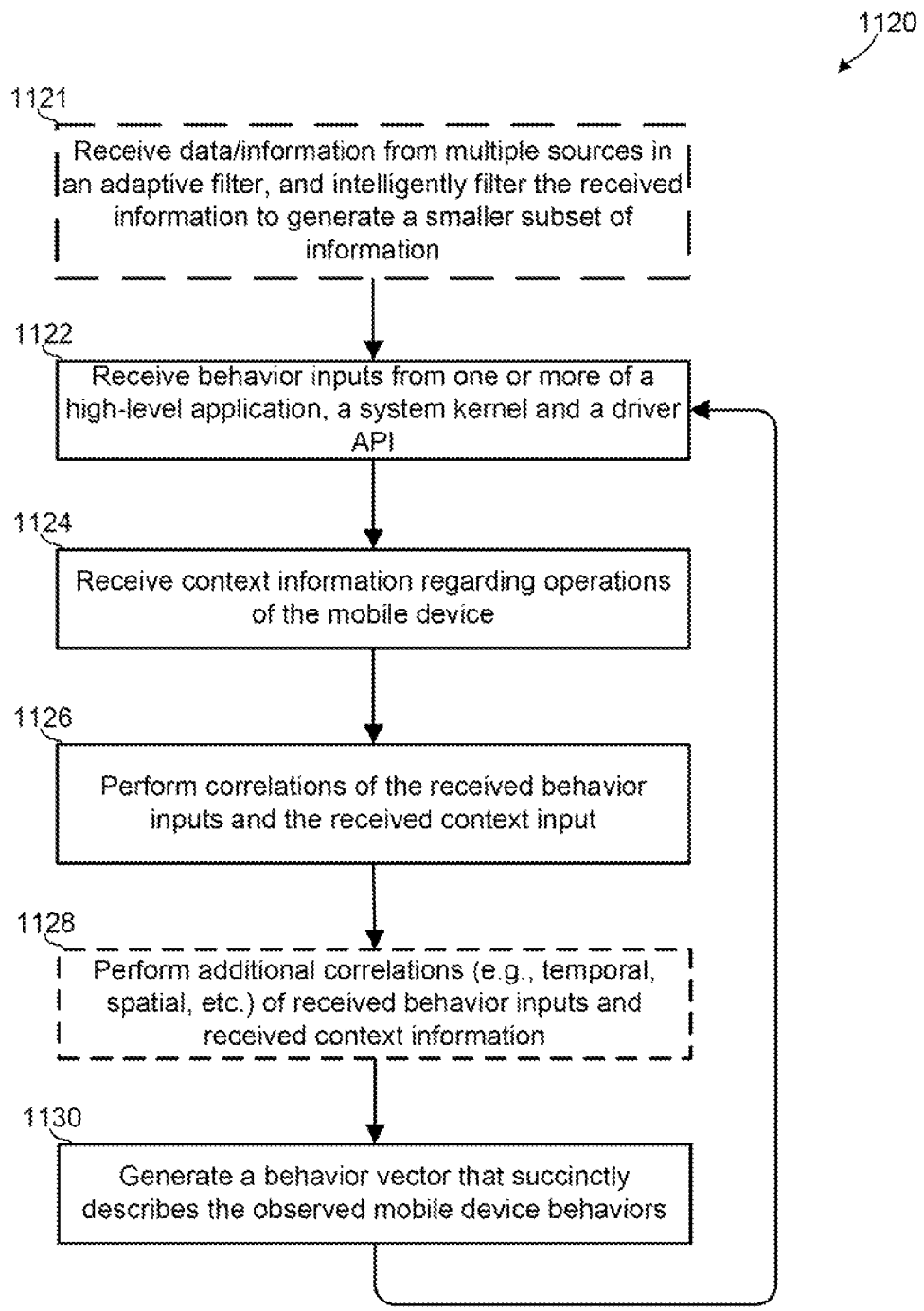

FIG. 11C illustrates an aspect method 1120 that may be performed as part of the operations of block 1116 described above with reference to FIG. 11B. As part of the process of identifying correlations between observed mobile device behaviors and inconsistent behaviors, the processor may receive behavior inputs from one or more of a high-level application, the system kernel, and a driver API in block 1122. In an embodiment, these inputs may first be filtered by an adaptive filter that screens out those inputs that the processor can determine are not associated with suspicious or inconsistent behaviors in optional block 1121.

In block 1124, the processor may receive context information regarding ongoing operations of the mobile device as described above. In block 1126, the processor may perform correlations (e.g., spatial correlations, etc.) of the received behavior inputs and the received context information as described above. Optionally, the processor may also perform additional correlations (e.g., temporal correlations) of received behavior inputs, and receive context information in order to identify those observed behaviors that are related in optional block 1128. For example, the processor may perform temporal correlations to identify behaviors that are related in time (e.g., preceding closely in time versus simultaneous) with inconsistent behaviors. Using this information, the processor may generate a behavior vector that succinctly describes the observed mobile device behaviors in block 1130 as described above. Such a behavioral vector may include information collected from APIs at various operational software levels and from various software/hardware modules of the mobile device.

A behavior vector generated in block 1130 may include, for example, information related to one or more of library API calls, system calls, file-system and network sub-system operations, sensor device state changes, file system activity, network activity, telephone activity, memory access operations, a state of the mobile device, a power on/off state of an electronic display, a locked/unlocked state of the mobile device, the amount of battery power remaining, inter-process communications (IPC), driver statistics, and hardware counters.

A behavior vector generated in block 1130 may have a vector data structure that includes a series of numbers, each of which signifies feature or behavior of the mobile device. Such numbers may include binary flags (i.e., a single bit having a value of either 1 or 0), such as to indicate whether a camera of the mobile device is in use or not, counter values, such as amount of network traffic that has been generated by the mobile device or a number of Internet messages that have been sent by the mobile device within a period of time.

A behavior vector generated in block 1130 may also include one or more of call information, text messaging information, media messaging information, user account information, location information, camera information, accelerometer information, and browser information. As discussed above, the information used to generate the behavior vector may include information collected at an application level of the mobile device, at a radio level of the mobile device, and a sensor level of the mobile device (e.g., a camera or microphone).

Figure 12:
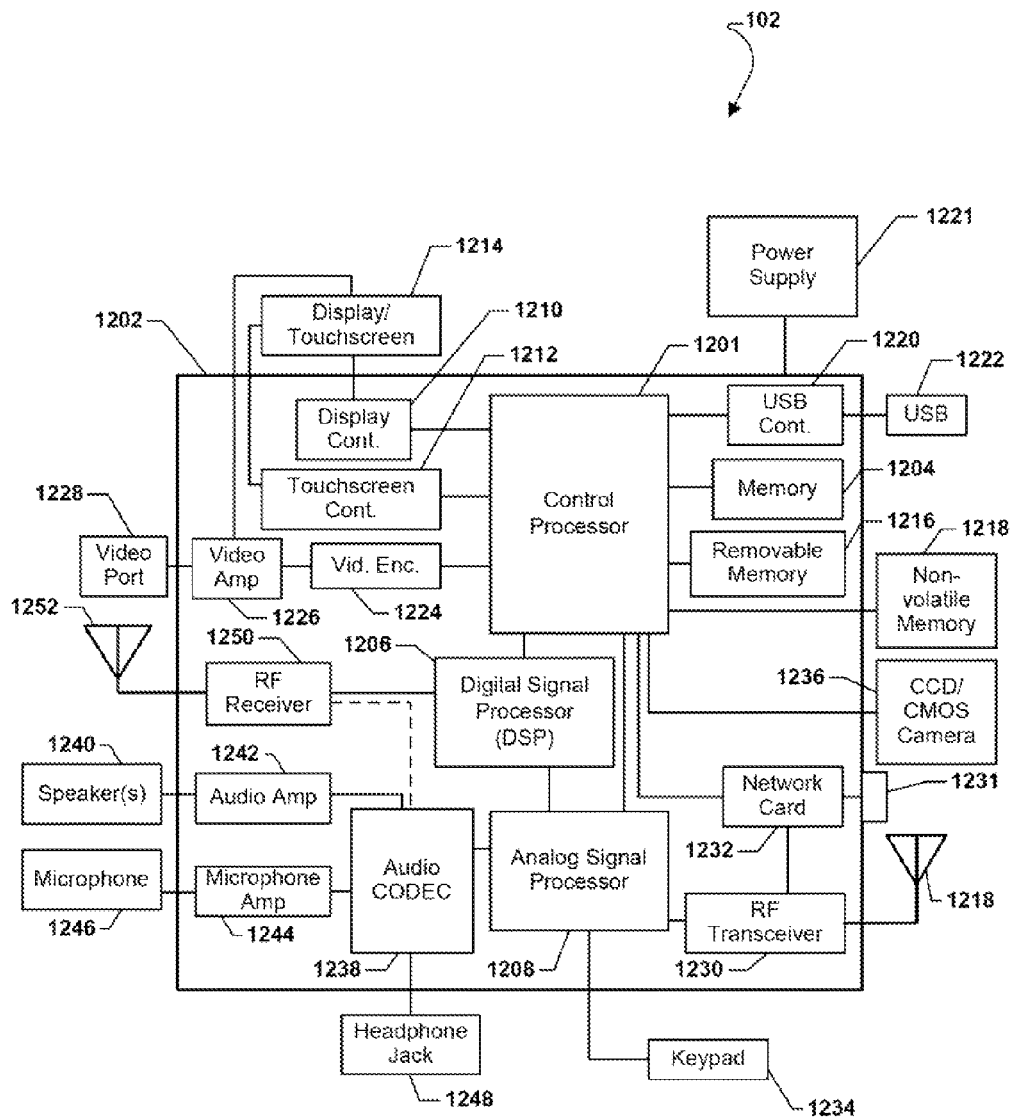
FIG. 12 is a component block diagram of mobile device suitable for use with the various aspects.

Example components and modules of an exemplary, non-limiting aspect of such a mobile device 102 are illustrated in FIG. 12. A mobile computing device 120 may include a circuit board 1202 of electronic components, some or all of which may be integrated into an on-chip system, that includes a control processor 1201 coupled to memory 1204. The control processor 1201 may further be coupled to a digital signal processor 1206 and/or an analog signal processor 1208, which also be coupled together. In some embodiments, the control processor 1201 and a digital signal processor 1206 may be the same component or may be integrated into the same processor chip. A display controller 1210 and a touchscreen controller 1212 may be coupled to the control processor 1201 and to a display/touchscreen 1214 within or connected to the mobile computing device 102.

The control processor 1201 may also be coupled to removable memory 1216 (e.g., an SD memory or SIM card in the case of mobile computing devices) and/or to external memory 1218, such as one or more of a disk drive, CD drive, and a DVD drive. The control processor 1201 may also be coupled to a Universal Serial Bus (USB) controller 1220 which couples to a USB port 1222. In various aspects, a power supply 1221 may be coupled to the circuit board 1202 through the USB controller 1220 or through different electrical connections to provide power (e.g., DC power) to the various electronic components.

The control processor 1201 may also be coupled to a video encoder 1224, e.g., a phase alternating line (PAL) encoder, a sequential couleur a memoire (SECAM) encoder, or a national television system(s) committee (NTSC) encoder. Further, the video encoder 1224 may be coupled to a video amplifier 1226 which may be coupled to the video encoder 1224 and the display/touchscreen 1214. Also, a video port 1228 may be coupled to the video amplifier 1226 to enable connecting the mobile computing device 102 to an external monitor, television or other display (not shown).

The control processor 1201 may be coupled to a radio frequency (RF) transceiver 1230, such as via an analog signal processor 1208. The RF transceiver 1230 may be coupled to an RF antenna 1218 for transmitting and receiving RF signals. The RF transceiver 1230 may be configured to transmit and receive communication signals of one or more different wireless communication protocols including, for example, cellular telephone (e.g., G-3, UMTS, CDMA, etc.), WiFi, WiMax, and Bluetooth.

The control processor 1201 may further be coupled to a network card 1232 which may be coupled to a network connector 1231 and/or the RF transceiver 1230 and configured to enable communications via an external network (e.g., local area networks, the Internet, an intranet, WiFi networks, Bluetooth networks, personal area network (PAN) etc.) The network card 1232 may be in the form of a separate chip or card, or may be implemented as part of the control processor 1201 or the RF transceiver 1230 (or both) as a full solution communication chip.

A number of analog devices may be coupled to the control processor 1201 via the analog signal processor 1208, such as a keypad 1234. In other implementations, a keypad or keyboard may include its own processor so that the interface with the control processor 1201 may be via direct connection (not shown), via a network connection (e.g., via the network card), or via the USB port 1222.

In some implementations, a digital camera 1236 may be coupled to the control processor 1201. In an exemplary aspect, the digital camera 1236 may be a charge-coupled device (CCD) camera or a complementary metal-oxide semiconductor (CMOS) camera. The digital camera 1236 may be built into the mobile computing device 102 or coupled to the device by an external cable.

In some implementations, an audio CODEC 1238 (e.g., a stereo CODEC) may be coupled to the analog signal processor 1208 and configured to send sound signals to one or more speakers 1240 via an audio amplifier 1242. The audio CODEC 1238 may also be coupled to a microphone amplifier 1244 which may be coupled to a microphone 1246 (e.g., via a microphone jack). A headphone jack 1248 may also be coupled to the audio CODEC 1238 for outputting audio to headphones.

In some implementations, the mobile computing device 102 may include a separate RF receiver circuit 1250 which may be coupled to an antenna 1252 for receiving broadcast wireless communication signals. The receiver circuit 1250 may be configured to receive broadcast television signals (e.g., EBMS broadcasts), and provide received signals to the DSP 1206 for processing. In some implementations, the receiver circuit 1250 may be configured to receive FM radio signals, in which case the received signals may be passed to the Audio CODEC 1238 for processing.

In an aspect, processor-executable instructions for accomplishing one or more of the method operations described above may be stored in the internal memory 1204, removable memory 1216 and/or non-volatile memory 1218 (e.g., as on a hard drive, CD drive, or other storage accessible via a network). Such processor-executable instructions may be executed by the control processor 1201 in order to perform the methods described herein.

Figure 13:
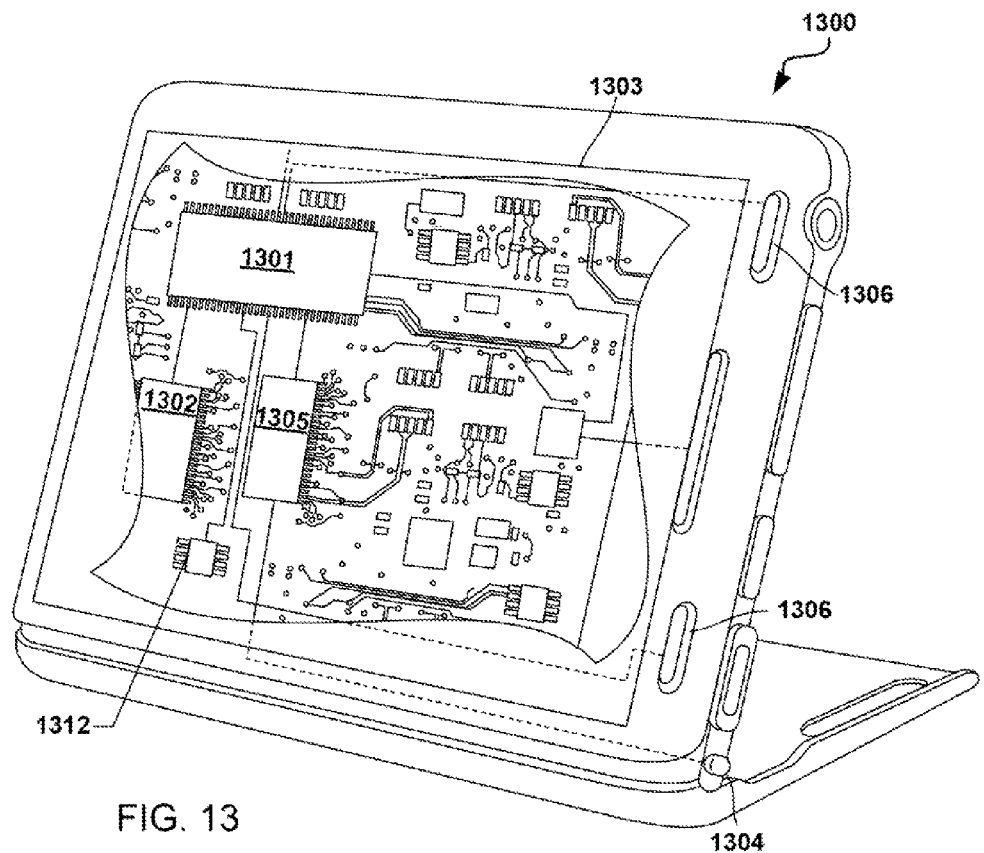
FIG. 13 is an illustration of an example mobile device suitable for use with the various aspects.

The various aspects may be implemented on a variety of mobile computing devices, an example of which is illustrated in FIG. 13 in the form of a smartphone. A smartphone 1300 may include a processor 1301 coupled to internal memory 1302, a display 1303, and to a speaker. Additionally, the smartphone 1300 may include an antenna 1304 for sending and receiving electromagnetic radiation that may be connected to a wireless data link and/or cellular telephone transceiver 1305 coupled to the processor 1301. Smartphone 1300 typically also include menu selection buttons or rocker switches 1306 for receiving user inputs.

A typical smartphone 1300 also includes a sound encoding/decoding (CODEC) circuit 1312, which digitizes sound received from a microphone into data packets suitable for wireless transmission and decodes received sound data packets to generate analog signals that are provided to the speaker to generate sound. Also, one or more of the processor 1301, wireless transceiver 1305 and CODEC 1312 may include a digital signal processor (DSP) circuit (not shown separately).

Figure 14:
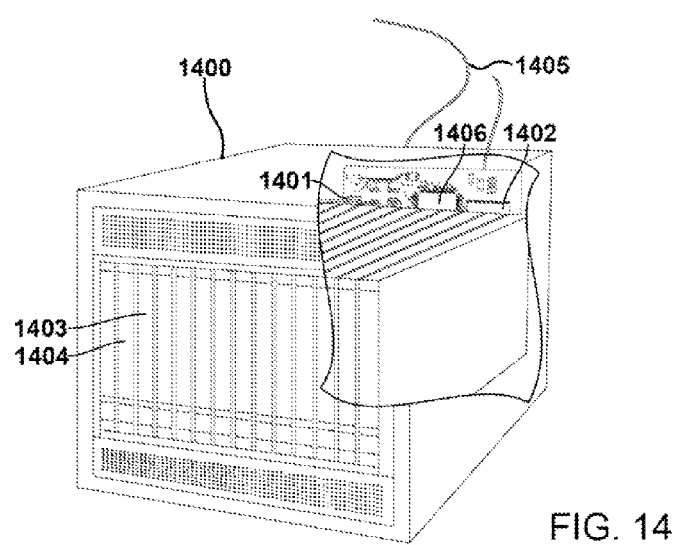
FIG. 14 is an illustration of an example server computer suitable for use with the various aspects.

Portions of the aspect methods may be accomplished in a client-server architecture with some of the processing occurring in a server, such as maintaining databases of normal operational behaviors, which may be accessed by a mobile device processor while executing the aspect methods. Such aspects may be implemented on any of a variety of commercially available server devices, such as the server 1400 illustrated in FIG. 14. Such a server 1400 typically includes a processor 1401 coupled to volatile memory 1402 and a large capacity nonvolatile memory, such as a disk drive 1403. The server 1400 may also include a floppy disc drive, compact disc (CD) or DVD disc drive 1411 coupled to the processor 1401. The server 1400 may also include network access ports 1404 coupled to the processor 1401 for establishing data connections with a network 1405, such as a local area network coupled to other broadcast system computers and servers.

The processors 1301, 1401 may be any programmable microprocessor, microcomputer or multiple processor chip or chips that can be configured by software instructions (applications) to perform a variety of functions, including the functions of the various aspects described below. In some mobile devices, multiple processors 1301 may be provided, such as one processor dedicated to wireless communication functions and one processor dedicated to running other applications. Typically, software applications may be stored in the internal memory 1302, 1402, 1403 before they are accessed and loaded into the processor 1301,

1401. The processor 1301, 1401 may include internal memory sufficient to store the application software instructions.

Many mobile computing devices operating system kernels are organized into a user space (where non-privileged code runs) and a kernel space (where privileged code runs). This separation is of particular importance in Android® and other general public license (GPL) environments where code that is part of the kernel space must be GPL licensed, while code running in the user-space may not be GPL licensed. It should be understood that the various software components/modules discussed here may be implemented in either the kernel space or the user space, unless expressly stated otherwise.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method for observing computing device behaviors over a period of time via a processor of a computing device to recognize the computing device behaviors that are inconsistent with normal operation patterns of the computing device, the method comprising:
   dynamically selecting, via the processor, one or more computing device behaviors for observation;
   adaptively observing, via the processor, the dynamically selected computing device behaviors to collect behavior information;
   generating a vector data structure that succinctly describes the collected behavior information via a plurality of numbers; and
   using, by the processor, the vector data structure to identify a suspicious device behavior.

2. The method of claim 1, wherein adaptively observing the dynamically selected computing device behaviors to collect the behavior information comprises monitoring: file-system operations, file system activity, searches for filenames, file operations, and changes in file permissions.

3. The method of claim 1, wherein adaptively observing the dynamically selected computing device behaviors to collect the behavior information comprises monitoring:
   device state changes; and
   sensor state changes.

4. The method of claim 1, wherein adaptively observing the dynamically selected computing device behaviors to collect the behavior information comprises monitoring:
   a number of forks;
   a number of memory access operations; and
   a number of files open.

5. The method of claim 1, wherein adaptively observing the dynamically selected computing device behaviors to collect the behavior information comprises monitoring one or more of:
- a display on/off state;
- a locked/unlocked state;
- a battery charge state;
- a camera state; and
- a microphone state.

6. The method of claim 1, wherein adaptively observing the dynamically selected computing device behaviors to collect the behavior information comprises monitoring one or more of:
- inter-process communications related to crucial services;
- a degree of inter-process communications; and
- inter-process communications related to pop-up windows.

7. The method of claim 1, wherein adaptively observing the dynamically selected computing device behaviors to collect the behavior information comprises collecting one or more of:
- statistic information from a driver for cameras;
- statistic information from a driver for sensors;
- statistic information from a driver for electronic displays;
- statistic information from a driver for data controllers;
- statistic information from a driver for memory controllers;
- statistic information from a driver for system controllers;
- statistic information from a driver for access ports;
- statistic information from a driver for peripheral devices; and
- statistic information from a driver for external memory chips.

8. The method of claim 1, wherein adaptively observing the dynamically selected computing device behaviors to collect the behavior information comprises monitoring one or more of:
- a status of a hardware component for cameras;
- a status of a hardware component for sensors;
- a status of a hardware component for electronic displays;
- a status of a hardware component for data controllers;
- a status of a hardware component for memory controllers;
- a status of a hardware component for system controllers;
- a status of a hardware component for access ports;
- a status of a hardware component for timers;
- a status of a hardware component for peripheral devices;
- a status of a hardware component for external memory chips;
- a status of a hardware component for voltage regulators;
- a status of a hardware component for oscillators;
- a status of a hardware component for phase-locked loops; and
- a status of a hardware component for peripheral bridges.

9. The method of claim 1, wherein adaptively observing the dynamically selected computing device behaviors to collect the behavior information comprises monitoring one or more of:
- a hardware counter that denotes a state of the computing devices; and
- a special-purpose register of the processor that stores a count of hardware-related events.

10. The method of claim 1, wherein adaptively observing the dynamically selected computing device behaviors to collect the behavior information comprises:
- collecting one or more of location information, camera information, accelerometer information, browser information, phonebook or contact information, recorded audio information and calendar information; and
- monitoring one or more of content of browser-based communications, content of voice-based communications, short range radio communications, content of text-based communications, content of recorded audio files, notifications communicated to and from a software application, user verifications, and a user password.

11. The method of claim 1, wherein adaptively observing the dynamically selected computing device behaviors to collect the behavior information comprises:
- collecting information that indicates whether a first software application operating on the computing device requested to download and install a second software application on the computing device.

12. The method of claim 1, wherein adaptively observing the dynamically selected computing device behaviors to collect the behavior information comprises monitoring one or more of:
- changes to compass settings;
- changes to device settings;
- changes to battery life settings;
- changes to gyroscope settings;
- changes to pressure sensor settings; and
- changes to screen settings.

13. The method of claim 1, wherein adaptively observing the dynamically selected computing device behaviors to collect the behavior information comprises monitoring one or more of:
- facial recognition software;
- social streams;
- notes entered by a user
- use of an electronic payment service;
- events relating to synchronization;
- voice searches;
- voice control;
- language translators;
- offloading of data for computations;
- video streaming;
- camera usage without user activity; and
- microphone usage without user activity.

14. The method of claim 1, wherein adaptively observing the dynamically selected computing device behaviors to collect the behavior information comprises one of:
- monitoring magnet sensors;
- detecting near-field communications;
- collecting information from a credit card scanner, barcode scanner, or mobile tag reader;
- detecting that a keyboard or auxiliary device has been coupled to the computing device;
- determining whether a light emitting diode, flash, flashlight, or light source has been modified or disabled;
- determining whether a speaker or microphone has been turned on or powered;
- detecting a charging or power event;
- detecting that the computing device is being used as a game controller;
- collecting information from medical sensors or from scanning a user's body;
- collecting information from an external sensor plugged into an audio jack;
- collecting information from a tactile or haptic sensor; and
- collecting information pertaining to a thermal state of the computing device.

15. The method of claim 1, further comprising:
- filtering the collected behavior information via an adaptive filter;

receiving behavior inputs from one or more of a high-level application, a system kernel and a driver application programming interface (API) after filtering by the adaptive filter;

receiving context information regarding operations of the computing device; and performing spatial correlations of the received behavior inputs and the received context information.

16. The method of claim 15, wherein generating the vector data structure comprises generating a vector that includes information pertaining to one or more of:
library API calls;
system calls;
file-system operations;
sensor device state changes;
file system activity;
telephone activity;
memory access operations;
a state of the computing device;
a power on/off state of an electronic display of the computing device;
a locked/unlocked state the computing device;
an amount of battery power remaining;
inter-process communications (IPC);
driver statistics; and
hardware counters.

17. The method of claim 15, wherein generating the vector data structure comprises:
generating the vector data structure to include a series of numbers, each of which signifies a feature of the computing device.

18. The method of claim 17, wherein at least one of the series of numbers identifies one or more of:
whether a camera of the computing device is in use; and
how many internet messages have been sent from the computing device.

19. The method of claim 15, wherein generating the vector data structure comprises generating a vector that includes at least one of:
call information;
text messaging information;
media messaging information;
user account information;
location information;
camera information;
accelerometer information; and
browser information.

20. The method of claim 15, wherein generating the vector data structure comprises generating a vector that includes information collected at a radio level of the computing device.

21. The method of claim 15, wherein generating the vector data structure comprises generating a vector that includes information collected at a sensor level of the computing device.

22. The method of claim 15, further comprising:
performing temporal correlations of the received behavior inputs and the received context information, wherein generating the vector data structure comprises generating a behavior vector based on a result of the spatial and temporal correlations.

23. A computing device, comprising a multi-core processor including two or more processor cores, one or more of which is configured with processor-executable instructions to perform operations comprising:
dynamically selecting one or more computing device behaviors for observation;
adaptively observing the dynamically selected computing device behaviors to collect behavior information;
generating a vector data structure that succinctly describes the collected behavior information via a plurality of numbers; and
using the vector data structure to identify a suspicious device behavior.

24. The computing device of claim 23, wherein one or more of the processor cores is configured with processor-executable instructions to perform operations such that adaptively observing the dynamically selected computing device behaviors to collect the behavior information comprises monitoring: file-system operations, file system activity, searches for filenames, file operations, and changes in file permissions.

25. The computing device of claim 23, wherein one or more of the processor cores is configured with processor-executable instructions to perform operations such that adaptively observing the dynamically selected computing device behaviors to collect the behavior information comprises monitoring:
device state changes and sensor devices state changes.

26. The computing device of claim 23, wherein one or more of the processor cores is configured with processor-executable instructions to perform operations such that adaptively observing the dynamically selected computing device behaviors to collect the behavior information comprises monitoring:
a number of forks;
a number of memory access operations; and
a number of files open.

27. The computing device of claim 23, wherein one or more of the processor cores is configured with processor-executable instructions to perform operations such that adaptively observing the dynamically selected computing device behaviors to collect the behavior information comprises monitoring one or more of:
a display on/off state;
a locked/unlocked state;
a battery charge state;
a camera state; and
a microphone state.

28. The computing device of claim 23, wherein one or more of the processor cores is configured with processor-executable instructions to perform operations such that adaptively observing the dynamically selected computing device behaviors to collect the behavior information comprises monitoring one or more of:
inter-process communications related to crucial services;
a degree of inter-process communications; and
inter-process communications related to pop-up windows.

29. The computing device of claim 23, wherein one or more of the processor cores is configured with processor-executable instructions to perform operations such that adaptively observing the dynamically selected computing device behaviors to collect the behavior information comprises collecting one or more of:
statistic information from a driver for cameras;
statistic information from a driver for sensors;
statistic information from a driver for electronic displays;
statistic information from a driver for data controllers;
statistic information from a driver for memory controllers;
statistic information from a driver for system controllers;
statistic information from a driver for access ports;
statistic information from a driver for peripheral devices; and statistic information from a driver for external memory chips.

30. The computing device of claim 23, wherein one or more of the processor cores is configured with processor-executable instructions to perform operations such that adaptively observing the dynamically selected computing device behaviors to collect the behavior information comprises monitoring one or more of:
- a status of a hardware component for cameras;
- a status of a hardware component for sensors;
- a status of a hardware component for electronic displays;
- a status of a hardware component for data controllers;
- a status of a hardware component for memory controllers;
- a status of a hardware component for system controllers;
- a status of a hardware component for access ports;
- a status of a hardware component for timers;
- a status of a hardware component for peripheral devices;
- a status of a hardware component for external memory chips;
- a status of a hardware component for voltage regulators;
- a status of a hardware component for oscillators;
- a status of a hardware component for phase-locked loops; and
- a status of a hardware component for peripheral bridges.

31. The computing device of claim 23, wherein one or more of the processor cores is configured with processor-executable instructions to perform operations such that adaptively observing the dynamically selected computing device behaviors to collect the behavior information comprises monitoring one or more of:
- a hardware counter that denotes a state of the computing devices; and
- a special-purpose register of the processor that stores a count of hardware-related or events.

32. The computing device of claim 23, wherein one or more of the processor cores is configured with processor-executable instructions to perform operations such that adaptively observing the dynamically selected computing device behaviors to collect the behavior information comprises:
- collecting one or more of location information, camera information, accelerometer information, browser information, phonebook or contact information, recorded audio information and calendar information; and
- monitoring one or more of content of browser-based communications, content of voice-based communications, short range radio communications, content of text-based communications, content of recorded audio files, notifications communicated to and from a software application, user verifications, and a user password.

33. The computing device of claim 23, wherein one or more of the processor cores is configured with processor-executable instructions to perform operations such that adaptively observing the dynamically selected computing device behaviors to collect the behavior information comprises:
- collecting information that indicates whether a first software application operating on the computing device requested to download and install a second software application.

34. The computing device of claim 23, wherein one or more of the processor cores is configured with processor-executable instructions to perform operations such that adaptively observing the dynamically selected computing device behaviors to collect the behavior information comprises monitoring one or more of:
- changes to compass settings;
- changes to device settings;
- changes to battery life settings;
- changes to gyroscope settings;
- changes to pressure sensor settings; and
- changes to screen activity settings.

35. The computing device of claim 23, wherein one or more of the processor cores is configured with processor-executable instructions to perform operations wherein adaptively observing the dynamically selected computing device behaviors to collect the behavior information comprises monitoring one or more of:
- facial recognition software;
- social streams;
- notes entered by a user
- use of an electronic payment services;
- events relating to synchronization;
- voice searches;
- voice control;
- language translators;
- offloading of data for computations;
- video streaming;
- camera usage without user activity; and
- microphone usage without user activity.

36. The computing device of claim 23, wherein one or more of the processor cores is configured with processor-executable instructions to perform operations such that adaptively observing the dynamically selected computing device behaviors to collect the behavior information comprises one of:
- monitoring magnet sensors;
- detecting near-field communications;
- collecting information from a credit card scanner, barcode scanner, or mobile tag reader;
- detecting that a keyboard or auxiliary device has been coupled to the computing device;
- determining whether a light emitting diode, flash, flashlight, or light source has been modified or disabled;
- determining whether a speaker or microphone has been turned on or powered;
- detecting a charging or power event;
- detecting that the computing device is being used as a game controller;
- collecting information from medical purpose/healthcare sensors or from scanning the user's body;
- collecting information from an external sensor plugged into one of a USB port and an audio jack;
- collecting information from a tactile or haptic sensor; and
- collecting information pertaining to a thermal state of the computing device.

37. The computing device of claim 23, wherein one or more of the processor cores is configured with processor-executable instructions to perform operations further comprising:
- filtering the collected behavior information via an adaptive filter;
- receiving behavior inputs from one or more of a high-level application, a system kernel and a driver application programming interface (API) after filtering by the adaptive filter;
- receiving context information regarding operations of the computing device; and
- performing spatial correlations of the received behavior inputs and the received context information.

38. The computing device of claim 37, wherein one or more of the processor cores is configured with processor-executable instructions to perform operations such that generating the vector data structure comprises generating a vector that includes information pertaining to one or more of:
- library API calls;
- system calls;
- file-system operations;
- sensor device state changes;
- file system activity;
- telephone activity;
- memory access operations;
- a state of the computing device;
- a power on/off state of an electronic display of the computing device;
- a locked/unlocked state the computing device;
- an amount of battery power remaining;
- inter-process communications (IPC);
- driver statistics; and
- hardware counters.

39. The computing device of claim 37, wherein one or more of the processor cores is configured with processor-executable instructions to perform operations such that generating the vector data structure comprises:
- generating the vector data structure to include a series of numbers, each of which signifies a feature of the computing device.

40. The computing device of claim 39, wherein one or more of the processor cores is configured with processor-executable instructions to perform operations such that at least one of the series of numbers identifies one or more of:
- whether a camera of the computing device is in use ; and
- how many internet messages have been sent from the computing device.

41. The computing device of claim 37, wherein one or more of the processor cores is configured with processor-executable instructions to perform operations such that generating the vector data structure comprises generating a vector that includes at least one of:
- call information;
- text messaging information;
- media messaging information;
- user account information;
- location information;
- camera information;
- accelerometer information; and
- browser information.

42. The computing device of claim 37, wherein one or more of the processor cores is configured with processor-executable instructions to perform operations such that generating the vector data structure comprises generating a vector that includes information collected at a radio level of the computing device.

43. The computing device of claim 37, wherein one or more of the processor cores is configured with processor-executable instructions to perform operations such that generating the vector data structure comprises generating a vector that includes information collected at a sensor level of the computing device.

44. The computing device of claim 37, wherein one or more of the processor cores is configured with processor-executable instructions to perform operations further comprising:
- performing temporal correlations of the received behavior inputs and the received context information, wherein generating the vector data structure comprises generating a behavior vector based on a result of the spatial and temporal correlations.

45. A computing device, comprising:
- means for dynamically selecting one or more computing device behaviors for observation;
- means for adaptively observing the dynamically selected computing device behaviors to collect behavior information;
- means for generating a vector data structure that succinctly describes the collected behavior information via a plurality of numbers; and
- means for using the vector data structure to identify a suspicious device behavior.

46. The computing device of claim 45, wherein means for adaptively observing the dynamically selected computing device behaviors to collect the behavior information comprises means for monitoring: file-system operations, file system activity, searches for filenames, file operations, and changes in file permissions.

47. The computing device of claim 45, wherein means for adaptively observing the dynamically selected computing device behaviors to collect the behavior information comprises means for monitoring:
- device state changes; and
- sensor state changes.

48. The computing device of claim 45, wherein means for adaptively observing the dynamically selected computing device behaviors to collect the behavior information comprises means for monitoring:
- a number of forks;
- a number of memory access operations; and
- a number of files open.

49. The computing device of claim 45, wherein means for adaptively observing the dynamically selected computing device behaviors to collect the behavior information comprises means for monitoring one or more of:
- a display on/off state;
- a locked/unlocked state;
- a battery charge state;
- a camera state; and
- a microphone state.

50. The computing device of claim 45, wherein means for adaptively observing the dynamically selected computing device behaviors to collect the behavior information comprises means for monitoring one or more of:
- inter-process communications related to crucial services;
- a degree of inter-process communications; and
- inter-process communications related to pop-up windows.

51. The computing device of claim 45, wherein means for adaptively observing the dynamically selected computing device behaviors to collect the behavior information comprises means for collecting one or more of:
- statistic information from a driver for cameras;
- statistic information from a driver for sensors;
- statistic information from a driver for electronic displays;
- statistic information from a driver for data controllers;
- statistic information from a driver for memory controllers;
- statistic information from a driver for system controllers;
- statistic information from a driver for access ports;
- statistic information from a driver for peripheral devices; and
- statistic information from a driver for external memory chips.

52. The computing device of claim 45, wherein means for adaptively observing the dynamically selected computing device behaviors to collect the behavior information comprises means for monitoring:
- cameras, sensors, electronic displays, data controllers, memory controllers, system controllers, access ports, timers, peripheral devices, external memory chips, voltage regulators, oscillators, phase-locked loops, peripheral bridges, and other similar components used to support the processors and clients running on the computing device.

53. The computing device of claim 45, wherein means for adaptively observing the dynamically selected computing device behaviors to collect the behavior information comprises means for monitoring one or more of:
  a status of a hardware component for cameras;
  a status of a hardware component for sensors;
  a status of a hardware component for electronic displays;
  a status of a hardware component for data controllers;
  a status of a hardware component for memory controllers;
  a status of a hardware component for system controllers;
  a status of a hardware component for access ports;
  a status of a hardware component for timers;
  a status of a hardware component for peripheral devices;
  a status of a hardware component for external memory chips;
  a status of a hardware component for voltage regulators;
  a status of a hardware component for oscillators;
  a status of a hardware component for phase-locked loops; and
  a status of a hardware component for peripheral bridges.

54. The computing device of claim 45, wherein means for adaptively observing the dynamically selected computing device behaviors to collect the behavior information comprises:
  means for collecting one or more of location information, camera information, accelerometer information, browser information, phonebook or contact information, recorded audio information and calendar information; and
  means for monitoring one or more of content of browser-based communications, content of voice-based communications, short range radio communications, content of text-based communications, content of recorded audio files, notifications communicated to and from a software application, user verifications, and a user password.

55. The computing device of claim 45, wherein means for adaptively observing the dynamically selected computing device behaviors to collect the behavior information comprises means for collecting information that indicates whether a first software application operating on the computing device requested to download and install a second software application.

56. The computing device of claim 45, wherein means for adaptively observing the dynamically selected computing device behaviors to collect the behavior information comprises means for monitoring one or more of:
  changes to compass settings;
  changes to device settings;
  changes to battery life settings;
  changes to gyroscope settings;
  changes to pressure sensor settings; and
  changes to screen settings.

57. The computing device of claim 45, wherein means for adaptively observing the dynamically selected computing device behaviors to collect the behavior information comprises means for monitoring one or more of
  facial recognition software;
  social streams;
  notes entered by a user
  use of an electronic payment services;
  events relating to synchronization;
  voice searches;
  voice control;
  language translators;
  offloading of data for computations;
  video streaming;
  camera usage without user activity; and
  microphone usage without user activity.

58. The computing device of claim 45, wherein means for adaptively observing the dynamically selected computing device behaviors to collect the behavior information comprises one or more of:
  means for monitoring magnet sensors;
  means for detecting near-field communications;
  means for collecting information from a credit card scanner, barcode scanner, or mobile tag readers;
  means for detecting that a keyboard or auxiliary device has been coupled to the computing devices;
  means for determining whether a light emitting diode, flash, flashlight, or light source has been modified or disabled;
  means for determining whether a speaker or microphone has been turned on or powered;
  means for detecting a charging or power event;
  means for detecting that the computing device is being used as a game controller;
  means for collecting information from medical purpose/healthcare sensors or from scanning the user's body;
  means for collecting information from an external sensor plugged into one of a USB port and an audio jacks;
  means for collecting information from a tactile or haptic sensor; and
  means for collecting information pertaining to a thermal state of the computing device.

59. The computing device of claim 45, further comprising:
  means for filtering the collected behavior information via an adaptive filter;
  means for receiving behavior inputs from one or more of a high-level application, a system kernel and a driver application programming interface (API) after filtering by the adaptive filter;
  means for receiving context information regarding operations of the computing device; and
  means for performing spatial correlations of the received behavior inputs and the received context information.

60. The computing device of claim 59, wherein means for generating the vector data structure comprises means for generating a vector that includes information pertaining to one or more of:
  library API calls;
  system calls;
  file-system operations;
  sensor device state changes;
  file system activity;
  telephone activity;
  memory access operations;
  a state of the computing device;
  a power on/off state of an electronic display of the computing device;
  a locked/unlocked state the computing device;
  an amount of battery power remaining;
  inter-process communications (IPC);
  driver statistics; and
  hardware counters.

61. The computing device of claim 59, wherein means for generating the vector data structure comprises:

means for generating the vector data structure to include a series of numbers, each of which signifies a feature of the computing device.

62. The computing device of claim 61, wherein at least one of the series of numbers identifies one or more of:
whether a camera of the computing device is in use; and
how many internet messages have been sent from the computing device.

63. The computing device of claim 59, wherein means for generating the vector data structure comprises means for generating a vector that includes at least one of:
call information;
text messaging information;
media messaging information;
user account information;
location information;
camera information;
accelerometer information; and
browser information.

64. The computing device of claim 59, wherein means for generating the vector data structure comprises means for generating a vector that includes information collected at a radio level of the computing device.

65. The computing device of claim 59, wherein means for generating the vector data structure comprises means for generating a vector that includes information collected at a sensor level of the computing device.

66. The computing device of claim 59, wherein further comprising:
means for performing temporal correlations of the received behavior inputs and the received context information, wherein means for generating the vector data structure comprises means for generating a behavior vector based on a result of the spatial and temporal correlations.

67. A non-transitory processor-readable storage medium having stored thereon processor-executable instructions configured to cause a processor to perform operations comprising:
dynamically selecting one or more computing device behaviors for observation;
adaptively observing the dynamically selected computing device behaviors to collect behavior information;
generating a vector data structure that succinctly describes the collected behavior information via a plurality of numbers; and
using the vector data structure to identify a suspicious device behavior.

68. The non-transitory processor-readable storage medium of claim 67, wherein the stored processor-executable instructions are configured to cause a processor to perform operations such that adaptively observing the dynamically selected computing device behaviors to collect the behavior information comprises monitoring: file-system operations, file system activity, searches for filenames, file operations, and changes in file permissions.

69. The non-transitory processor-readable storage medium of claim 67, wherein the stored processor-executable instructions are configured to cause a processor to perform operations such that adaptively observing the dynamically selected computing device behaviors to collect the behavior information comprises monitoring:
device state changes; and
sensor state changes.

70. The non-transitory processor-readable storage medium of claim 67, wherein the stored processor-executable instructions are configured to cause a processor to perform operations such that adaptively observing the dynamically selected computing device behaviors to collect the behavior information comprises monitoring:
a number of forks;
a number of memory access operations; and
a number of files open.

71. The non-transitory processor-readable storage medium of claim 67, wherein the stored processor-executable instructions are configured to cause a processor to perform operations such that adaptively observing the dynamically selected computing device behaviors to collect the behavior information comprises monitoring one or more of:
a display on/off state;
a locked/unlocked state;
a battery charge state;
a camera state; and
a microphone state.

72. The non-transitory processor-readable storage medium of claim 67, wherein the stored processor-executable instructions are configured to cause a processor to perform operations such that adaptively observing the dynamically selected computing device behaviors to collect the behavior information comprises monitoring one or more of:
inter-process communications related to crucial services;
a degree of inter-process communications; and
inter-process communications related to pop-up windows.

73. The non-transitory processor-readable storage medium of claim 67, wherein the stored processor-executable instructions are configured to cause a processor to perform operations such that adaptively observing the dynamically selected computing device behaviors to collect the behavior information comprises collecting one or more of:
statistic information from a driver for cameras;
statistic information from a driver for sensors;
statistic information from a driver for electronic displays;
statistic information from a driver for data controllers;
statistic information from a driver for memory controllers;
statistic information from a driver for system controllers;
statistic information from a driver for access ports;
statistic information from a driver for peripheral devices; and
statistic information from a driver for external memory chips.

74. The non-transitory processor-readable storage medium of claim 67, wherein the stored processor-executable instructions are configured to cause a processor to perform operations such that adaptively observing the dynamically selected computing device behaviors to collect the behavior information comprises monitoring one or more of:
a status of a hardware component for cameras;
a status of a hardware component for sensors;
a status of a hardware component for electronic displays;
a status of a hardware component for data controllers;
a status of a hardware component for memory controllers;
a status of a hardware component for system controllers;
a status of a hardware component for access ports;
a status of a hardware component for timers;
a status of a hardware component for peripheral devices;
a status of a hardware component for external memory chips;
a status of a hardware component for voltage regulators;
a status of a hardware component for oscillators;

a status of a hardware component for phase-locked loops; and a status of a hardware component for peripheral bridges.

75. The non-transitory processor-readable storage medium of claim 67, wherein the stored processor-executable instructions are configured to cause a processor to perform operations such that adaptively observing the dynamically selected computing device behaviors to collect the behavior information comprises monitoring one or more of:
- a hardware counters that denotes a state of the computing device; and
- a special-purpose register of the processor that stores a count of hardware-related events.

76. The non-transitory processor-readable storage medium of claim 67, wherein the stored processor-executable instructions are configured to cause a processor to perform operations such that adaptively observing the dynamically selected computing device behaviors to collect the behavior information comprises:
- collecting one or more of location information, camera information, accelerometer information, browser information, phonebook or contact information, recorded audio information and calendar information; and
- monitoring one or more of content of browser-based communications, content of voice-based communications, short range radio communications, content of text-based communications, content of recorded audio files, notifications communicated to and from a software application, user verifications, and a user password.

77. The non-transitory processor-readable storage medium of claim 67, wherein the stored processor-executable instructions are configured to cause a processor to perform operations such that adaptively observing the dynamically selected computing device behaviors to collect the behavior information comprises:
- collecting information that indicates whether a first software application operating on the computing device requested to download and install a second software application.

78. The non-transitory processor-readable storage medium of claim 67, wherein the stored processor-executable instructions are configured to cause a processor to perform operations such that adaptively observing the dynamically selected computing device behaviors to collect the behavior information comprises monitoring one or more of:
- changes to compass settings;
- changes to device settings;
- changes to battery life settings;
- changes to gyroscope settings;
- changes to pressure sensor settings; and
- changes to screen settings.

79. The non-transitory processor-readable storage medium of claim 67, wherein the stored processor-executable instructions are configured to cause a processor to perform operations such that adaptively observing the dynamically selected computing device behaviors to collect the behavior information comprises monitoring on or more of:
- facial recognition software;
- social streams;
- notes entered by a user
- use of an electronic payment service;
- events relating to synchronization;
- voice searches;
- voice control;
- language translators;
- offloading of data for computations;
- video streaming;
- camera usage without user activity; and
- microphone usage without user activity.

80. The non-transitory processor-readable storage medium of claim 67, wherein the stored processor-executable instructions are configured to cause a processor to perform operations such that adaptively observing the dynamically selected computing device behaviors to collect the behavior information comprises one of:
- monitoring magnet sensors;
- detecting near-field communications;
- collecting information from a credit card scanner, barcode scanner, or mobile tag reader;
- detecting that a keyboard or auxiliary device has been coupled to the computing device;
- determining whether a light emitting diode, flash, flashlight, or light source has been modified or disabled;
- determining whether a speaker or microphone has been turned on or powered;
- detecting a charging or power event;
- detecting that the computing device is being used as a game controller;
- collecting information from medical sensors or from scanning a user's body;
- collecting information from an external sensor plugged into an audio jack;
- collecting information from a tactile or haptic sensor; and
- collecting information pertaining to a thermal state of the computing device.

81. The non-transitory processor-readable storage medium of claim 67, wherein the stored processor-executable instructions are configured to cause a processor to perform operations further comprising:
- filtering the collected behavior information via an adaptive filter;
- receiving behavior inputs from one or more of a high-level application, a system kernel and a driver application programming interface (API) after filtering by the adaptive filter;
- receiving context information regarding operations of the computing device; and
- performing spatial correlations of the received behavior inputs and the received context information.

82. The non-transitory processor-readable storage medium of claim 81, wherein the stored processor-executable instructions are configured to cause a processor to perform operations such that generating the vector data structure comprises generating a vector that includes information pertaining to one or more of:
- library API calls;
- system calls;
- file-system operations;
- sensor device state changes;
- file system activity;
- telephone activity;
- memory access operations;
- a state of the computing device;
- a power on/off state of an electronic display of the computing device;
- a locked/unlocked state the computing device;
- an amount of battery power remaining;
- inter-process communications (IPC);
- driver statistics; and
- hardware counters.

83. The non-transitory processor-readable storage medium of claim 81, wherein the stored processor-executable instructions are configured to cause a processor to perform operations such that generating the vector data structure comprises:
    generating the vector data structure to include a series of numbers, each of which signifies a feature of the computing device.

84. The non-transitory processor-readable storage medium of claim 83, wherein the stored processor-executable instructions are configured to cause a processor to perform operations such that at least one of the series of numbers identifies one or more of:
    whether a camera of the computing device is in use; and
    how many internet messages have been sent from the computing device.

85. The non-transitory processor-readable storage medium of claim 81, wherein the stored processor-executable instructions are configured to cause a processor to perform operations such that generating the vector data structure comprises generating a vector that includes at least one of:
    call information;
    text messaging information;
    media messaging information;
    user account information;
    location information;
    camera information;
    accelerometer information; and
    browser information.

86. The non-transitory processor-readable storage medium of claim 81, wherein the stored processor-executable instructions are configured to cause a processor to perform operations such that generating the vector data structure comprises generating a vector that includes information collected at a radio level of the computing device.

87. The non-transitory processor-readable storage medium of claim 81, wherein the stored processor-executable instructions are configured to cause a processor to perform operations such that generating the vector data structure comprises generating a vector that includes information collected at a sensor level of the computing device.

88. The non-transitory processor-readable storage medium of claim 81, wherein the stored processor-executable instructions are configured to cause a processor to perform operations further comprising:
    performing temporal correlations of the received behavior inputs and the received context information, wherein generating the vector data structure comprises generating a behavior vector based on a result of the spatial and temporal correlations.

89. A method of improving performance on a mobile device, comprising:
    performing on a mobile device processor real-time behavior analysis of one or more mobile device behaviors to generate coarse observations;
    identifying suspicious behavior from the coarse observations;
    dynamically determining the mobile device behaviors that require further observation in greater detail;
    dynamically determining a level of detail required for the further observation;
    performing finer observations based on the determined level of detail required for the further observation;
    generating a vector data structure that succinctly describes the finer observations via a plurality of numbers; and
    using the vector data structure to identify suspicious behavior from the finer observations.

90. The method of claim 89, further comprising:
    performing mobile devices operations to correct the identified suspicious behavior.

91. A computing device, comprising a multi-core processor including two or more processor cores, one or more of which is configured with processor-executable instructions to perform operations comprising:
    performing on a mobile device processor real-time behavior analysis of one or more mobile device behaviors to generate coarse observations;
    identifying suspicious behavior from the coarse observations;
    dynamically determining the mobile device behaviors that require further observation in greater detail;
    dynamically determining a level of detail required for the further observation;
    performing finer observations based on the determined level of detail required for the further observation;
    generating a vector data structure that succinctly describes the finer observations via a plurality of numbers; and
    using the vector data structure to identify suspicious behavior from the finer observations.

92. The computing device of claim 91, wherein one or more of the processor cores is configured with processor-executable instructions to perform operations further comprising:
    performing mobile devices operations to correct the identified suspicious behavior.

93. A computing device, comprising:
    means for performing on a mobile device processor real-time behavior analysis of one or more mobile device behaviors to generate coarse observations;
    means for identifying suspicious behavior from the coarse observations;
    means for dynamically determining the mobile device behaviors that require further observation in greater detail;
    means for dynamically determining a level of detail required for the further observation;
    means for performing finer observations based on the determined level of detail required for the further observation;
    means for generating a vector data structure that succinctly describes the finer observations via a plurality of numbers; and
    means for using the vector data structure to identify suspicious behavior from the finer observations.

94. The computing device of claim 93, further comprising:
    means for performing mobile devices operations to correct the identified suspicious behavior.

95. A non-transitory processor-readable storage medium having stored thereon processor-executable instructions to cause a processor to perform operations comprising:
    performing on a mobile device processor real-time behavior analysis of one or more mobile device behaviors to generate coarse observations;
    identifying suspicious behavior from the coarse observations;
    dynamically determining the mobile device behaviors that require further observation in greater detail;
    dynamically determining a level of detail required for the further observation;
    performing finer observations based on the determined level of detail required for the further observation;

generating a vector data structure that succinctly describes the finer observations via a plurality of numbers; and using the vector data structure to identify suspicious behavior from the finer observations.

96. The non-transitory processor-readable storage medium of claim 95, wherein the stored processor-executable instructions are configured to cause a processor to perform operations further comprising:

performing mobile devices operations to correct the identified suspicious behavior.

* * * * *